(12) United States Patent
Wenren

(10) Patent No.: US 11,573,402 B2
(45) Date of Patent: Feb. 7, 2023

(54) OPTICAL IMAGING LENS ASSEMBLY

(71) Applicant: Zhejiang Sunny Optical Co., Ltd., Ningbo (CN)

(72) Inventor: Jianke Wenren, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 366 days.

(21) Appl. No.: 16/854,372

(22) Filed: Apr. 21, 2020

(65) Prior Publication Data

US 2020/0249440 A1 Aug. 6, 2020

Related U.S. Application Data

(63) Continuation of application No. PCT/CN2019/077287, filed on Mar. 7, 2019.

(30) Foreign Application Priority Data

May 4, 2018 (CN) .......................... 201810421623.4

(51) Int. Cl.
*G02B 13/00* (2006.01)
*G02B 9/62* (2006.01)
*G02B 27/00* (2006.01)

(52) U.S. Cl.
CPC .......... *G02B 13/0045* (2013.01); *G02B 9/62* (2013.01); *G02B 27/0025* (2013.01)

(58) Field of Classification Search
USPC ........................................................ 359/713
See application file for complete search history.

(56) References Cited

U.S. PATENT DOCUMENTS

| 2014/0043695 A1 | 2/2014 | Hsu et al. |
| 2015/0260965 A1 | 9/2015 | Inoue |
| 2016/0124192 A1 | 5/2016 | Koreeda |

FOREIGN PATENT DOCUMENTS

| CN | 202330846 U | 7/2012 |
| CN | 104950422 A | 9/2015 |
| CN | 204666935 U | 9/2015 |
| CN | 204679707 U | 9/2015 |
| CN | 105911675 A | 8/2016 |

(Continued)

OTHER PUBLICATIONS

Chinese Office Action for Application No. 19H11064CN, dated Dec. 23, 2021, 9 pages.

(Continued)

*Primary Examiner* — Collin X Beatty
*Assistant Examiner* — Grant A Gagnon
(74) *Attorney, Agent, or Firm* — Barnes & Thornburg LLP

(57) ABSTRACT

The application discloses an optical imaging lens assembly including, sequentially from an object side to an image side, a first lens, a second lens, a third lens, a fourth lens, a fifth lens, and a sixth lens, wherein the first lens has a positive refractive power, the second lens has a negative refractive power with a convex object side surface and a concave image side surface, the third lens has a refractive power, the fourth lens has a refractive power, the fifth lens has a positive refractive power with a convex image side surface, the sixth lens has a negative refractive power with a concave object side surface and a concave image side surface, and an effective focal length f of the optical imaging lens assembly, an effective focal length f3 of the third lens and an effective focal length f4 of the fourth lens satisfy |f/f3|+|f/f4|≤0.3.

20 Claims, 11 Drawing Sheets

(56) References Cited

FOREIGN PATENT DOCUMENTS

| | | |
|---|---|---|
| CN | 106483637 A | 3/2017 |
| CN | 106556919 A | 4/2017 |
| CN | 106896472 A | 6/2017 |
| CN | 107272151 A | 10/2017 |
| CN | 107436477 A | 12/2017 |
| CN | 107783254 A | 3/2018 |
| CN | 107861218 A | 3/2018 |
| CN | 108319003 A | 7/2018 |
| CN | 108535841 A | 9/2018 |
| CN | 108761716 A | 11/2018 |
| CN | 108761717 A | 11/2018 |
| CN | 108802972 A | 11/2018 |
| CN | 109507787 A | 3/2019 |
| CN | 109564336 A | 4/2019 |
| JP | 2013178483 A | 9/2013 |
| JP | 2015114505 A | 6/2015 |
| JP | 2015129869 A | 7/2015 |
| JP | 5894696 B1 | 3/2016 |
| JP | 6082839 B1 | 2/2017 |
| JP | 2017049329 A | 3/2017 |
| TW | 201113553 A1 | 4/2011 |
| TW | 201809783 A | 3/2018 |
| WO | 2014175058 A1 | 10/2014 |

OTHER PUBLICATIONS

First Chinese Office Action for Application No. 202110716143.2, dated Jun. 6, 2022, 9 pages.
International Search Report for Application No. 19H50575, 4 pages.
The First Chinese Office Action, dated Nov. 12, 2020, 9 pages.
First Chinese Office Action for Application No. 202110710878.4, dated Jul. 5, 2022, 11 pages.

OPTICAL IMAGING LENS ASSEMBLY

CROSS-REFERENCE TO RELATED APPLICATIONS

The present patent application is a continuation of International Application No. PCT/CN2019/077287, filed on Mar. 7, 2019, which claims priority from Chinese Patent Application No. 201810421623.4, filed on May 4, 2018 before the China National Intellectual Property Administration. Both of the aforementioned patent applications are hereby incorporated by reference in their entireties.

TECHNICAL FIELD

The disclosure relates to an optical imaging lens assembly, and more particularly, to an optical imaging lens assembly consisting of six lenses.

BACKGROUND

With the progress of science and technology, the electronic products with the photographing function develop rapidly, and the consumers has made higher and higher requirements for the imaging function of electronic products. In such a case, it raises higher requirements for the imaging quality of the imaging lens assembly. At the same time, with the progress of image sensors such as CCD and CMOS, the number of pixels on chip is increased and the size of a single pixel is reduced. Therefore, the requirement on the miniaturization of the imaging lens assembly is even higher.

The disclosure provides an optical lens assembly with an ultra-large optical imaging surface, which can be used in a 1/2.3-inch chip and has an ultra-large aperture.

SUMMARY

To solve at least one of the problems in the prior art, the disclosure provides an optical imaging lens assembly.

One aspect of the disclosure provides an optical imaging lens assembly including, sequentially from an object side to an image side, a first lens, a second lens, a third lens, a fourth lens, a fifth lens, and a sixth lens, wherein the first lens has a positive refractive power, the second lens has a negative refractive power with a convex object side surface and a concave image side surface, the third lens has a refractive power, the fourth lens has a refractive power, the fifth lens has a positive refractive power with a convex image side surface, the sixth lens has a negative refractive power with a concave object side surface and a concave image side surface, wherein an effective focal length f of the optical imaging lens assembly, an effective focal length f3 of the third lens and an effective focal length f4 of the fourth lens satisfy $|f/f3|+|f/f4| \le 0.3$.

According to one embodiment of the disclosure, half of a diagonal length ImgH of an effective pixel region on an imaging surface and a distance TTL along an optical axis from an object side surface of the first lens to the imaging surface satisfy $0.75 \le ImgH/TTL \le 0.9$.

According to one embodiment of the disclosure, the effective focal length f of the optical imaging lens assembly, an effective focal length f2 of the second lens, and an effective focal length f6 of the sixth lens satisfy $2.0 \le |f/f2|+|f/f6| < 3.0$.

According to one embodiment of the disclosure, an effective focal length f1 of the first lens and an effective focal length f5 of the fifth lens satisfy $0.5 < f1/f5 < 1.2$.

According to one embodiment of the disclosure, the effective focal length f of the optical imaging lens assembly and a curvature radius R5 of an object side surface of the third lens satisfy $0 < f/R5 < 0.5$.

According to one embodiment of the disclosure, the effective focal length f of the optical imaging lens assembly and a curvature radius R10 of the image side surface of the fifth lens satisfy $-2.5 < f/R10 < -1.5$.

According to one embodiment of the disclosure, a curvature radius R7 of an object side surface of the fourth lens and a curvature radius R8 of an image side surface of the fourth lens satisfy $0.5 < R7/R8 < 2.0$.

According to one embodiment of the disclosure, a space interval T34 between the third lens and the fourth lens along an optical axis, a central thickness CT3 of the third lens, and a central thickness CT4 of the fourth lens satisfy $T34/(CT3+CT4) \le 0.3$.

According to one embodiment of the disclosure, the effective focal length f of the optical imaging lens assembly and an entrance pupil diameter EPD of the optical imaging lens assembly satisfy $f/EPD \le 2.0$.

According to one embodiment of the disclosure, half of a maximum field of view HFOV of the optical imaging lens assembly, an effective focal length f5 of the fifth lens, and a central thickness CT5 of the fifth lens satisfy $4.5 \le f5*\tan(HFOV)/CT5 \le 8.0$.

According to one embodiment of the disclosure, a space interval T45 between the fourth lens and the fifth lens along an optical axis, a space interval T56 between the fifth lens and the sixth lens along the optical axis, and a central thickness CT5 of the fifth lens satisfy $1.3 < (T45+T56)/CT5 < 2.5$.

According to one embodiment of the disclosure, the first lens has a convex object side surface and a concave image side surface, and the fourth lens has a convex object side surface and a concave image side surface.

One aspect of the disclosure provides an optical imaging lens assembly including, sequentially from an object side to an image side, a first lens, a second lens, a third lens, a fourth lens, a fifth lens, and a sixth lens, wherein the first lens has a positive refractive power with a convex object side surface and a concave image side surface, the second lens has a negative refractive power with a convex object side surface and a concave image side surface, the third lens has a refractive power, the fourth lens has a refractive power with a convex object side surface and a concave image side surface, the fifth lens has a positive refractive power with a convex image side surface, the sixth lens has a negative refractive power with a concave object side surface and a concave image side surface, and half of a maximum field of view HFOV of the optical imaging lens assembly, an effective focal length f5 of the fifth lens, and a central thickness CT5 of the fifth lens satisfy $4.5 \le f5*\tan(HFOV)/CT5 \le 8.0$.

One aspect of the disclosure provides an optical imaging lens assembly including, sequentially from an object side to an image side, a first lens, a second lens, a third lens, a fourth lens, a fifth lens, and a sixth lens, wherein the first lens has a positive refractive power; the second lens has a negative refractive power with a convex object side surface and a concave image side surface; the third lens has a refractive power; the fourth lens has a refractive power; the fifth lens has a positive refractive power with a convex image side surface; the sixth lens has a negative refractive power with a concave object side surface and a concave image side surface, wherein a space interval T45 between the fourth lens and the fifth lens along an optical axis, a space interval T56 between the fifth lens and the sixth lens along the optical axis, and a central thickness CT5 of the fifth lens satisfy $1.3<(T45+T56)/CT5<2.5$.

One aspect of the disclosure provides an optical imaging lens assembly including, sequentially from an object side to an image side, a first lens, a second lens, a third lens, a fourth lens, a fifth lens, and a sixth lens, wherein the first lens has a positive refractive power; the second lens has a negative refractive power with a convex object side surface and a concave image side surface; the third lens has a refractive power; the fourth lens has a refractive power; the fifth lens has a positive refractive power with a convex image side surface; the sixth lens has a negative refractive power with a concave object side surface and a concave image side surface, wherein an effective focal length f of the optical imaging lens assembly and a curvature radius R5 of the object side surface of the third lens satisfy $0<f/R5<0.5$.

The optical imaging lens assembly according to the disclosure has an ultra-large optical imaging surface, which can be used in a 1/2.3-inch chip, and has an ultra-large aperture.

BRIEF DESCRIPTION TO THE DRAWINGS

Other features, objects and advantages of the disclosure will become more apparent from the following detailed description of non-limiting embodiments in conjunction with the accompanying drawings, in which.

DETAILED DESCRIPTION OF EMBODIMENTS

Figure 1:
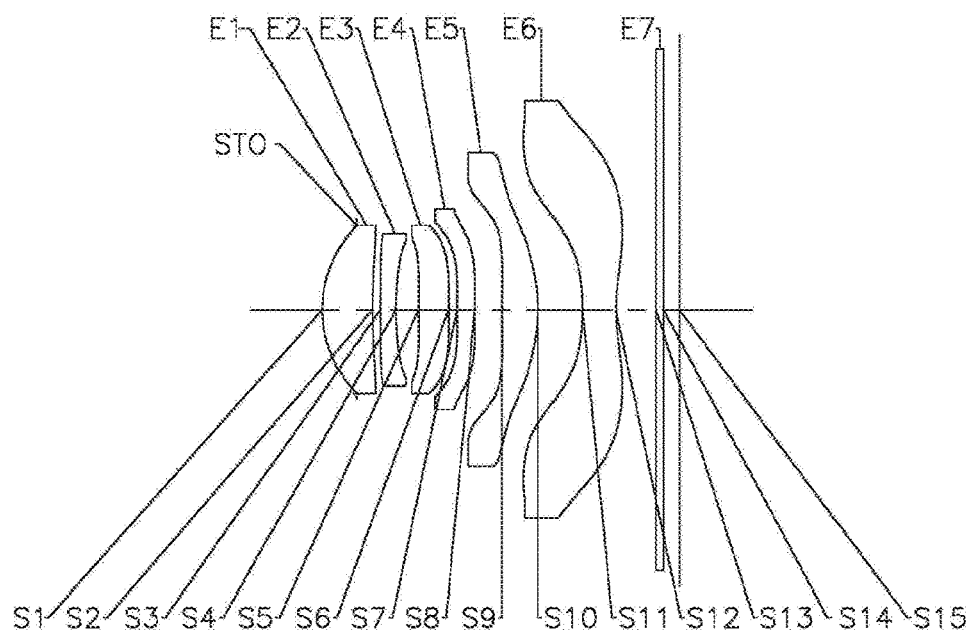
FIG. 1 shows a schematic structural diagram of an optical imaging lens assembly of Example 1.

Further details of the disclosure are described below with reference to the accompanying drawings and embodiments. It is understood that the specific embodiments described herein are used merely for explaining the related invention and should not be interpreted to be any limit to the invention. It should also be noted that, for ease of description, only the relevant parts of the disclosure are shown in the drawings.

It should be understood that in the disclosure, when an element or layer is described as being "on," "connected to", or "coupled to" another element or layer, it may be disposed directly on the another element or layer, directly connected or coupled to the another element or layer, or there may present an intermediate element or layer therebetween. When an element is referred to as being "directly on" another element or layer, "directly connected to" or "directly coupled to" another element or layer, there is no intermediate element or layer. Throughout the specification, the same reference numerals refer to the same elements. As used herein, the expression "and/or" includes any one of or any combination of the listed items.

It should be understood that while the terms 1st, 2nd or first, second, etc., may be used in this context to modify various elements, components, regions, layers and/or segments, these elements, components, regions, layers and/or segments should not be limited by these terms. These terms are used merely for distinguishing one component, component, region, layer or segment from another component, component, region, layer or segment. Therefore, without departing from the teachings of the disclosure, a first element, component, region, layer or segment discussed below may be referred to as a second element, component, region, layer or segment.

The terms used herein are used merely for the purpose of describing specific embodiments and are not intended to limit the disclosure. As used herein, features that do not be specifically limited as a singular or plural form does not exclude the plural form unless explicitly indicated in the context. It should also be understood that the terms "include," "including," "having," "comprise," and/or "comprising" when used in this specification indicate the presence of stated features, integrals, steps, operations, elements and/or components, but do not exclude the presence or addition of one or more other features, integrals, steps, operations, elements, components and/or combinations thereof. As used herein, the expression "and/or" includes any one of or any combination of the listed items. The expressions such as "at least one of . . . " preceding a list of features modify the entire list of features rather than an individual element in the list. Further, the use of "may," when describing implementations of the disclosure, refers to "one or more implementations of the disclosure." Also, the term "exemplary" is intended to refer to an example or illustration.

Unless otherwise defined, all terms (including technical and scientific terms) used herein have the same meaning as commonly understood by those of ordinary skill in the art to which the disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly defined as that herein.

It should be noted that the embodiments of the disclosure and the features of the embodiments may be combined without conflict. The disclosure will be described in detail below with reference to the accompanying drawings and in conjunction with the embodiments.

The disclosure provides an optical imaging lens assembly including, sequentially from an object side to an image side, a first lens having a positive refractive power; a second lens having a negative refractive power with a convex object side surface and a concave image side surface; a third lens having a refractive power; a fourth lens having a refractive power, a fifth lens having a positive refractive power with a convex image side surface, and a sixth lens having a negative refractive power with a concave object side surface and a concave image side surface.

According to an embodiment of the disclosure, half of a maximum field of view HFOV of the optical imaging lens assembly, an effective focal length f5 of the fifth lens, and a central thickness CT5 of the fifth lens satisfy 4.5≤f5*tan(HFOV)/CT5≤8.0, specifically 4.63≤f5*tan(HFOV)/CT5≤7.81. By satisfying the above-mentioned relation, the thickness of the fifth lens and the field of view of the optical imaging lens assembly can be appropriately distributed, a large imaging plan can be realized, and a relatively high optical performance and a better manufacturability can be achieved.

According to an embodiment of the disclosure, half of a diagonal length ImgH of an effective pixel region on an imaging surface and a distance TTL along an optical axis from an object side surface of the first lens to an imaging surface satisfy 0.75≤ImgH/TLL≤0.9, specifically, 0.75≤ImgH/TTL≤0.82. By satisfying the above relation, the ratio between the total length and the image height of the optical imaging lens assembly can be controlled, which can increase the size of the imaging plane and reduce the size of the system.

According to an embodiment of the disclosure, an effective focal length f of the optical imaging lens assembly, an effective focal length f3 of the third lens and an effective focal length f4 of the fourth lens satisfy |f/f3|+|f/f4|≤0.3, specifically, |f/f3|+|f/f4|≤0.27. By satisfying the above-mentioned relation, the refractive powers of the third lens and the fourth lens can be allocated appropriately, which is beneficial to realizing a large aperture. In addition, the chromatic aberration on the optical axis is reduced, which in turn improves the imaging quality of the lens assembly.

According to an embodiment of the disclosure, the effective focal length f of the optical imaging lens assembly, an effective focal length f2 of the second lens, and an effective focal length f6 of the sixth lens satisfy 2.0≤|f/f2|+|f/f6|<3.0, specifically, 2.06≤|f/f2|+|f/f6|≤2.35. By satisfying the above-mentioned relation, the refractive powers of the second lens and the sixth lens can be distributed appropriately, which is beneficial to realizing a large imaging plane of the optical system and ensuring a small optical distortion of the system.

According to an embodiment of the disclosure, an effective focal length f1 of the first lens and an effective focal length f5 of the fifth lens satisfy 0.5<f1/f5<1.2, more specifically, 0.85≤f1/f5≤1.14. By satisfying the above-mentioned relation, the refractive powers of the first lens and the fifth lens can be controlled appropriately to effectively reduce the optical sensitivity of the first lens and the fifth lens, which is more advantageous to realize the batch production.

According to an embodiment of the disclosure, the effective focal length f of the optical imaging lens assembly and a curvature radius R5 of an object side surface of the third lens satisfy 0<f/R5<0.5, more specifically, satisfy 0.19≤f/R5≤0.41. By satisfying the above-mentioned relation, the curvature radius of the object side surface of the third lens can be controlled to keep the contribution to the field curvature within a reasonable range, which reduces the optical sensitivity of the object side surface of the third lens.

According to an embodiment of the disclosure, the effective focal length f of the optical imaging lens assembly and a curvature radius R10 of the image side surface of the fifth lens satisfy −2.5<f/R10<−1.5, specifically, −2.26≤f/R10≤−1.82. By satisfying the above-mentioned relation, the curvature radius of the image side surface of the fifth lens can be controlled to reduce the chromatic aberration on the optical axis, so as to achieve a better imaging quality.

According to an embodiment of the disclosure, a curvature radius R7 of an object side surface of the fourth lens and a curvature radius R8 of an image side surface of the fourth lens satisfy 0.5<R7/R8<2.0, and specifically, 0.72≤R7/R8≤1.69. By satisfying the above relation, the ratio between the curvature radius of the object side surface of the fourth lens and the curvature radius of the image side surface of the fourth lens can be restricted within a certain range to reduce the optical distortion, so as to achieve a batter imaging quality.

According to an embodiment of the disclosure, a space interval T34 between the third lens and the fourth lens along an optical axis, a central thickness CT3 of the third lens, and a central thickness CT4 of the fourth lens satisfy T34/(CT3+CT4)≤0.3. By satisfying the above-mentioned relation, the space occupancy of the third and fourth lenses can be controlled appropriately, which can guarantee the shape processing and assembly stability of the lenses to ensure a better manufacturability.

According to an embodiment of the disclosure, a space interval T45 between the fourth lens and the fifth lens along an optical axis, a space interval T56 between the fifth lens and the sixth lens along the optical axis, and a central thickness CT5 of the fifth lens satisfy 1.3<(T45+T56)/

CT5<2.5, specifically 1.45≤(T45+T56)/CT5≤2.07. By satisfying the above-mentioned relation, the space occupancy of the fifth lens can be controlled appropriately, which can guarantee the assembling processing of the lenses, realize the miniaturization of the optical lens assembly and make it easier to meet the requirements of the whole system.

According to an embodiment of the disclosure, the effective focal length f of the optical imaging lens assembly and an entrance pupil diameter EPD of the optical imaging lens assembly satisfy f/EPD≤2.0. By satisfying the above-mentioned relation, the refractive power and the entrance pupil diameter limiting the imaging system can be distributed appropriately. The imaging system has a small F number and a large imaging plane. Therefore, the system has a large aperture and can realize a good imaging quality in the dark environment.

According to an embodiment of the disclosure, the first lens has a convex object side surface and a concave image side surface, and the fourth lens has a convex object side surface and a concave image side surface. By means of the above arrangement, the surface shapes of the first lens and the fourth lens can be further controlled, which is beneficial to ensuring the assembly stability of the optical imaging lens assembly and to realizing the batch production.

The disclosure is further described below with reference to specific examples.

Example 1

First, an optical imaging lens assembly according to Example 1 of the disclosure is described with reference to FIGS. 1 to 5.

FIG. 1 is a schematic structural diagram showing the optical imaging lens assembly of Example 1. As shown in FIG. 1, the optical imaging lens assembly includes six lenses. The six lenses are a first lens E1 having an object side surface S1 and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, and a sixth lens E6 having an object side surface S11 and an image side surface S12, respectively. The first lens E1 to the sixth lens E6 are sequentially disposed from an object side to an image side of the optical imaging lens assembly.

The first lens E1 may have a positive refractive power. The object side surface S1 of the first lens E1 may be convex and the image side surface S2 of the first lens E1 is concave. The second lens E2 may have a negative refractive power. The object side surface S3 of the second lens E2 may be convex and the image side surface S4 of the second lens E2 may be concave. The third lens E3 may have a positive refractive power. The object side surface S5 of the third lens E3 may be convex, and the image side surface S6 of the third lens E3 may be concave. The fourth lens E4 may have a negative refractive power. The object side surface S7 of the fourth lens E4 may be convex, and the image side surface S8 of the fourth lens E4 may be concave. The fifth lens E5 may have a positive refractive power. The object side surface S9 of the fifth lens E5 may be convex, and the image side surface S10 of the fifth lens E5 may be convex. The sixth lens E6 may have a negative refractive power. The object side surface S11 of the sixth lens E6 may be concave, and the image side surface S12 of the sixth lens E6 may be concave. The optical imaging lens assembly further includes a filter E7 having an object side surface S13 and an image side surface S14 for filtering infrared light. In this example, the light from an object passes through the surfaces S1 to S14 in sequence and is finally imaged on an imaging surface S15.

In this example, the first lens E1 to the sixth lens E6 have effective focal lengths f1 to f6, respectively. The first lens E1 to the sixth lens E6 are sequentially arranged along the optical axis and collectively determine the total effective focal length f of the optical imaging lens assembly. Table 1 below shows the effective focal lengths f1 to f6 of the first lens E1 to the sixth lens E6, the total effective focal length f of the optical imaging lens assembly, F-number Fno of the optical imaging lens assembly, and half of a maximum field of view HFOV (°) of the imaging lens assembly.

TABLE 1

| f1 (mm) | 3.98 | f (mm) | 4.53 |
|---|---|---|---|
| f2 (mm) | −9.74 | HFOV (°) | 41.3 |
| f3 (mm) | 62.23 | Fno | 1.84 |
| f4 (mm) | −158.38 | | |
| f5 (mm) | 4.22 | | |
| f6 (mm) | −2.85 | | |

Table 2 shows the surface type, curvature radius, thickness, refractive index, abbe number, and conic coefficient of each lens in the optical imaging lens assembly of this example, wherein the curvature radius and thickness are expressed in millimeters (mm).

TABLE 2

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5065 | | | |
| S1 | Aspherical | 1.7201 | 0.7401 | 1.55 | 56.1 | −6.7405 |
| S2 | Aspherical | 7.0033 | 0.1146 | | | 3.6872 |
| S3 | Aspherical | 12.8179 | 0.2300 | 1.67 | 20.4 | 60.4033 |
| S4 | Aspherical | 4.2845 | 0.3309 | | | 0.9833 |
| S5 | Aspherical | 23.5492 | 0.4433 | 1.55 | 56.1 | 99.0000 |
| S6 | Aspherical | 76.0601 | 0.1263 | | | 0.0000 |
| S7 | Aspherical | 13.7448 | 0.2600 | 1.67 | 20.4 | 0.0000 |
| S8 | Aspherical | 12.0728 | 0.4032 | | | −88.4129 |
| S9 | Aspherical | 29.3723 | 0.5245 | 1.55 | 56.1 | 0.0000 |
| S10 | Aspherical | −2.4897 | 0.6469 | | | −1.4626 |
| S11 | Aspherical | −5.0786 | 0.4903 | 1.54 | 55.9 | −1.4031 |
| S12 | Aspherical | 2.2596 | 0.5931 | | | −17.6496 |
| S13 | Spherical | Infinite | 0.1100 | 1.52 | 64.2 | |
| S14 | Spherical | Infinite | 0.2338 | | | |
| S15 | Spherical | Infinite | | | | |

In this example, each lens may use aspherical lens, and the shape of each of the aspherical surfaces x is limited by the following formula:

$$x = \frac{ch^2}{1+\sqrt{1-(k+1)c^2h^2}} + \sum A_i h^i \quad (1)$$

Here, x is the sag—axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the curvature radius in the above Table 2); k is the conic coefficient (shown in the above Table 2); and Ai is a correction coefficient for the i-th order of the aspheric surface.

Table 3 below shows the high-order coefficients of each of the aspherical surfaces S1-S12 that can be used for respective aspherical lens in this example.

TABLE 3

| Surface No. | A4 | A6 | A8 | A10 | A12 | A14 | A16 | A18 | A20 |
|---|---|---|---|---|---|---|---|---|---|
| S1 | 1.5522E−01 | −4.7105E−02 | −1.8509E−01 | 6.6389E−01 | −1.1105E+00 | 1.0951E+00 | −6.4508E−01 | 2.0980E−01 | −2.9079E−02 |
| S2 | −6.8433E−02 | 8.6444E−02 | −1.5960E−01 | 3.5599E−01 | −5.8246E−01 | 5.8613E−01 | −3.4420E−01 | 1.0809E−01 | −1.4127E−02 |
| S3 | −1.2256E−01 | 1.8918E−01 | −1.7940E−01 | 2.6216E−01 | −4.3496E−01 | 4.7141E−01 | −2.7428E−01 | 7.4357E−02 | −6.2115E−03 |
| S4 | −7.0423E−02 | 1.1558E−01 | 2.3163E−01 | −1.4123E+00 | 3.7920E+00 | −6.0218E+00 | 5.6996E+00 | −2.9454E+00 | 6.4037E−01 |
| S5 | −8.6025E−02 | 9.3599E−02 | −4.8277E−01 | 1.3703E+00 | −2.5380E+00 | 2.8853E+00 | −1.9075E+00 | 6.5603E−01 | −8.4955E−02 |
| S6 | −1.5286E−01 | 1.5768E−01 | −2.1267E−01 | −3.0280E−02 | 5.2748E−01 | −9.5564E−01 | 8.7112E−01 | −3.9744E−01 | 7.1007E−02 |
| S7 | −2.6407E−01 | 3.0478E−01 | −6.2388E−01 | 1.229SE+00 | −1.7486E+00 | 1.4786E+00 | −6.6991E−01 | 1.4034E−01 | −8.8766E−03 |
| S8 | −1.9858E−01 | 1.5815E−01 | −2.5455E−01 | 4.3681E−01 | −5.4185E−01 | 4.1794E−01 | −1.8717E−01 | 4.4561E−02 | −4.3459E−03 |
| S9 | −6.0778E−03 | −9.2504E−02 | 1.5977E−01 | −2.0995E−01 | 1.7203E−01 | −8.7415E−02 | 2.6536E−02 | −4.3403E−03 | 2.9176E−04 |
| S10 | 4.0565E−02 | −4.1573E−02 | 4.4052E−02 | −4.3886E−02 | 2.7021E−02 | −9.2639E−03 | 1.7575E−03 | −1.7346E−04 | 6.9567E−06 |
| S11 | −1.9059E−01 | 1.4259E−01 | −8.8984E−02 | 4.0508E−02 | −1.1504E−02 | 1.9966E−03 | −2.0743E−04 | 1.1894E−05 | −2.9023E−07 |
| S12 | −7.4248E−02 | 3.2258E−02 | −1.0532E−02 | 1.9888E−03 | −1.4227E−04 | −1.8944E−05 | 4.9598E−06 | −3.9887E−07 | 1.1470E−08 |

Figure 2:
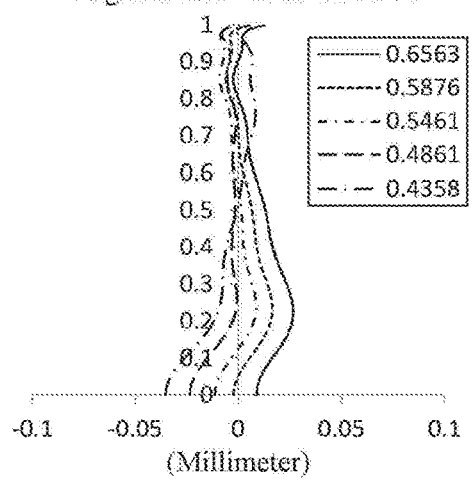
FIGS. 2 to 5 show a longitudinal aberration curve, an astigmatic curve, a distortion curve and a lateral color curve of the optical imaging lens assembly of Example 1, respectively.
Figure 3:
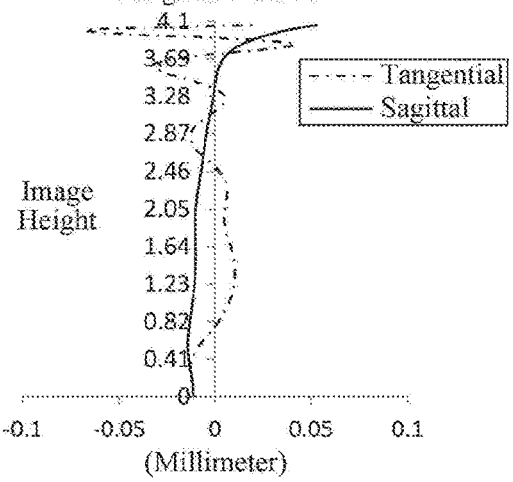
Figure 4:
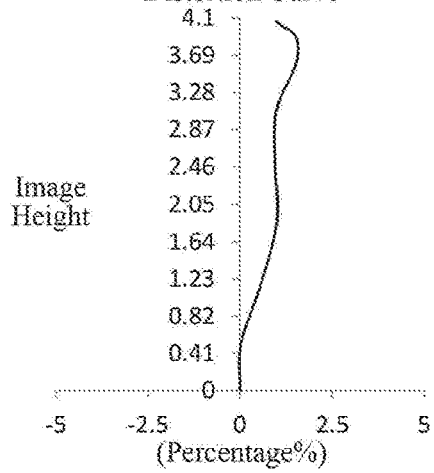
Figure 5:
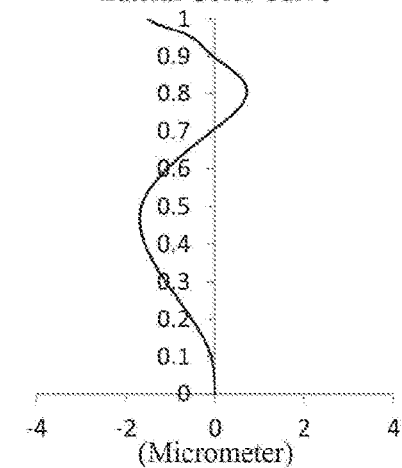

FIG. 2 illustrates a longitudinal aberration curve of the optical imaging system according to Example 1, representing deviations of focal points converged by light of different wavelengths after passing through the optical imaging system. FIG. 3 illustrates an astigmatism curve of the optical imaging system according to Example 1, representing a curvature of a tangential plane and a curvature of a sagittal plane. FIG. 4 illustrates a distortion curve of the optical imaging system according to Example 1, representing amounts of distortion corresponding to different FOVs. FIG. 5 illustrates a lateral color curve of the optical imaging system according to Example 1, representing deviations of different image heights on an image plane after light passes through the optical imaging system. It can be determined from the above description and FIGS. 2 to 5 that the optical imaging lens assembly according to Example 1 is an optical lens assembly having an ultra-large optical imaging surface, which can be used in a 1/2.3-inch chip, and having an ultra-large aperture.

Example 2

An optical imaging lens assembly according to Example 2 of the disclosure is described below with reference to FIGS. 6 to 10.

Figure 6:
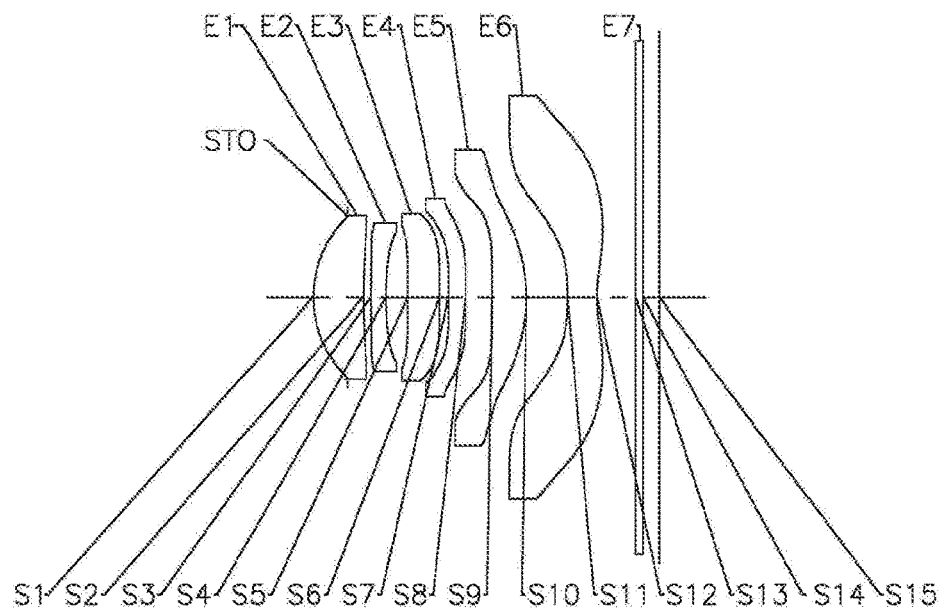
FIG. 6 shows a schematic structural diagram of an optical imaging lens assembly of Example 2.

FIG. 6 is a schematic structural diagram showing the optical imaging lens assembly of Example 2. As shown in FIG. 6, the optical imaging lens assembly includes six lenses. The six lenses are a first lens E1 having an object side surface S1 and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, and a sixth lens E6 having an object side surface S11 and an image side surface S12, respectively. The first lens E1 to the sixth lens E6 are sequentially disposed from an object side to an image side of the optical imaging lens assembly.

The first lens E1 may have a positive refractive power. The object side surface S1 of the first lens E1 may be convex and the image side surface S2 of the first lens E1 is concave. The second lens E2 may have a negative refractive power. The object side surface S3 of the second lens E2 may be convex and the image side surface S4 of the second lens E2 may be concave. The third lens E3 may have a positive refractive power. The object side surface S5 of the third lens E3 may be convex, and the image side surface S6 of the third lens E3 may be concave. The fourth lens E4 may have a positive refractive power. The object side surface S7 of the fourth lens E4 may be convex, and the image side surface S8 of the fourth lens E4 may be concave. The fifth lens E5 may have a positive refractive power. The object side surface S9 of the fifth lens E5 may be convex, and the image side surface S10 of the fifth lens E5 may be convex. The sixth lens E6 may have a negative refractive power. The object side surface S11 of the sixth lens E6 may be concave, and the image side surface S12 of the sixth lens E6 may be concave.

Table 4 shows below effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 4

| f1 (mm) | 3.88 | f (mm) | 4.54 |
|---|---|---|---|
| f2 (mm) | −9.39 | HFOV (°) | 41.0 |
| f3 (mm) | 552.96 | Fno | 1.84 |
| f4 (mm) | 70.17 | | |
| f5 (mm) | 4.28 | | |
| f6 (mm) | −2.76 | | |

Table 5 below shows the surface type, curvature radius, thickness, refractive index, abbe number, and conic coefficient of each lens in the optical imaging lens assembly of this example, wherein the curvature radius and thickness are expressed in millimeters (mm).

TABLE 5

| | | | | Material | | Conic |
|---|---|---|---|---|---|---|
| Surface No. | Surface Type | Curvature Radius | Thick- ness | Refractive Index | Abbe Number | Co- efficient |
| OBJ | Spherical | Infinite | Infinite | | | |
| STO | Spherical | Infinite | −0.5241 | | | |
| S1 | Aspherical | 1.6943 | 0.7624 | 1.55 | 56.1 | −6.5498 |
| S2 | Aspherical | 7.0645 | 0.1128 | | | 2.0184 |
| S3 | Aspherical | 13.2061 | 0.2300 | 1.67 | 20.4 | 69.3241 |
| S4 | Aspherical | 4.2233 | 0.3309 | | | 2.1132 |
| S5 | Aspherical | 17.2472 | 0.4845 | 1.55 | 56.1 | 99.0000 |
| S6 | Aspherical | 18.1095 | 0.1345 | | | 0.0000 |
| S7 | Aspherical | 13.2929 | 0.2600 | 1.67 | 20.4 | 0.0000 |
| S8 | Aspherical | 18.4064 | 0.4011 | | | −56.9170 |
| S9 | Aspherical | 186.4753 | 0.5227 | 1.55 | 56.1 | 0.0000 |
| S10 | Aspherical | −2.3676 | 0.6167 | | | −1.3873 |
| S11 | Aspherical | −5.2067 | 0.4489 | 1.54 | 55.9 | −0.8751 |
| S12 | Aspherical | 2.1275 | 0.5908 | | | −20.3566 |

TABLE 5-continued

| Surface No. | Surface Type | Curvature Radius | Thickness | Material Refractive Index | Abbe Number | Conic Coefficient |
|---|---|---|---|---|---|---|
| S13 | Spherical | Infinite | 0.1100 | 1.52 | 64.2 | |
| S14 | Spherical | Infinite | 0.2448 | | | |
| S15 | Spherical | Infinite | | | | |

Table 6 below shows the high-order coefficients of each of the aspherical surfaces S1-S12 that can be used for respective aspherical lens in this example. Each aspherical surface type may be defined by formula (1) given in Example 1 above.

TABLE 6

| Surface No. | A4 | A6 | A8 | A10 | A12 | A14 | A16 | A18 | A20 |
|---|---|---|---|---|---|---|---|---|---|
| S1 | 1.5702E−01 | −4.4097E−02 | −1.9057E−01 | 6.6023E−01 | −1.0828E+00 | 1.0505E+00 | −6.0949E−01 | 1.9525E−01 | −2.6669E−02 |
| S2 | −7.2322E−02 | 7.6426E−02 | −8.4804E−02 | 1.6439E−01 | −2.9637E−01 | 3.2140E−01 | −1.9753E−01 | 6.3962E−02 | −8.6108E−03 |
| S3 | −1.3788E−01 | 2.3358E−01 | −2.5263E−01 | 3.9038E−01 | −6.4069E−01 | 7.0434E−01 | −4.4154E−01 | 1.4289E−01 | −1.8310E−02 |
| S4 | −8.1382E−02 | 1.2884E−01 | 3.2738E−01 | −1.8106E+00 | 4.5897E+00 | −6.9562E+00 | 6.3463E+00 | −3.1905E+00 | 6.8076E−01 |
| S5 | −1.0897E−01 | 1.8140E−01 | −7.4952E−01 | 1.8467E+00 | −2.7642E+00 | 2.2996E+00 | −8.2621E−01 | −6.5988E−02 | 9.3280E−02 |
| S6 | −1.5415E−01 | 6.5239E−02 | 1.1192E−01 | −6.8431E−01 | 1.4400E+00 | −1.7500E+00 | 1.2580E+00 | −4.8868E−01 | 7.8214E−02 |
| S7 | −2.3331E−01 | 1.0573E−01 | −7.1710E−02 | 1.1222E−01 | −9.3070E−02 | −9.2530E−02 | 2.0692E−01 | −1.2098E−01 | 2.3324E−02 |
| S8 | −1.7605E−01 | 7.2415E−02 | −1.2029E−01 | 2.9950E−01 | −4.1645E−01 | 3.2533E−01 | −1.4381E−01 | 3.3804E−02 | −3.2891E−03 |
| S9 | −2.5313E−03 | −1.0973E−01 | 1.6627E−01 | −2.0723E−01 | 1.7422E−01 | −9.3195E−02 | 2.9814E−02 | −5.1078E−03 | 3.5746E−04 |
| S10 | 3.7682E−02 | −5.6231E−02 | 5.9013E−02 | −5.2140E−02 | 3.0838E−02 | −1.0585E−02 | 2.0367E−03 | −2.0468E−04 | 8.3654E−06 |
| S11 | −2.3947E−01 | 1.8500E−01 | −1.0415E−01 | 4.2918E−02 | −1.1510E−02 | 1.9349E−03 | −1.9722E−04 | 1.1169E−05 | −2.7015E−07 |
| S12 | −8.9659E−02 | 4.1748E−02 | −1.3612E−02 | 2.7224E−03 | −2.8183E−04 | 2.0123E−07 | 3.2888E−06 | −3.1626E−07 | 9.6673E−09 |

Figures 7, 8:
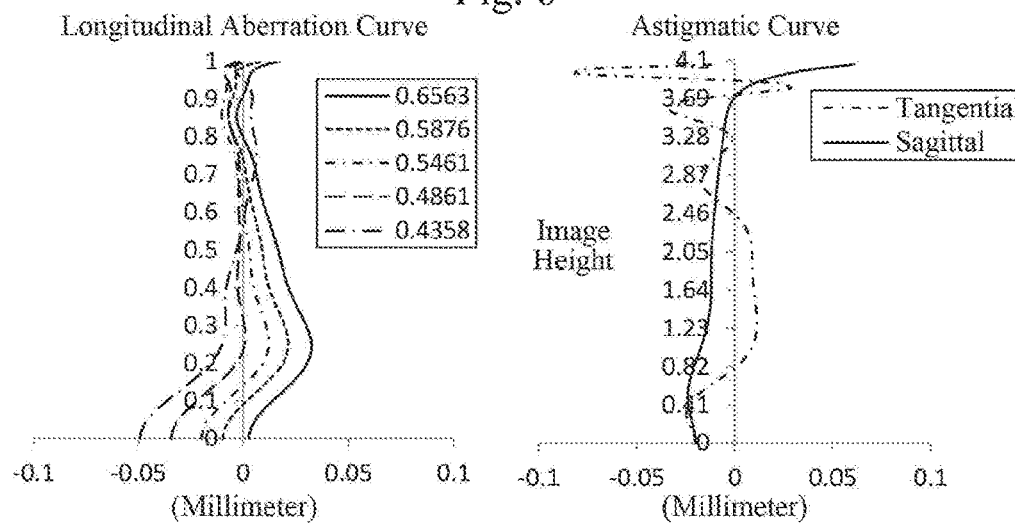
FIGS. 7 to 10 show a longitudinal aberration curve, an astigmatic curve, a distortion curve and a lateral color curve of the optical imaging lens assembly of Example 2, respectively.
Figures 9, 10:
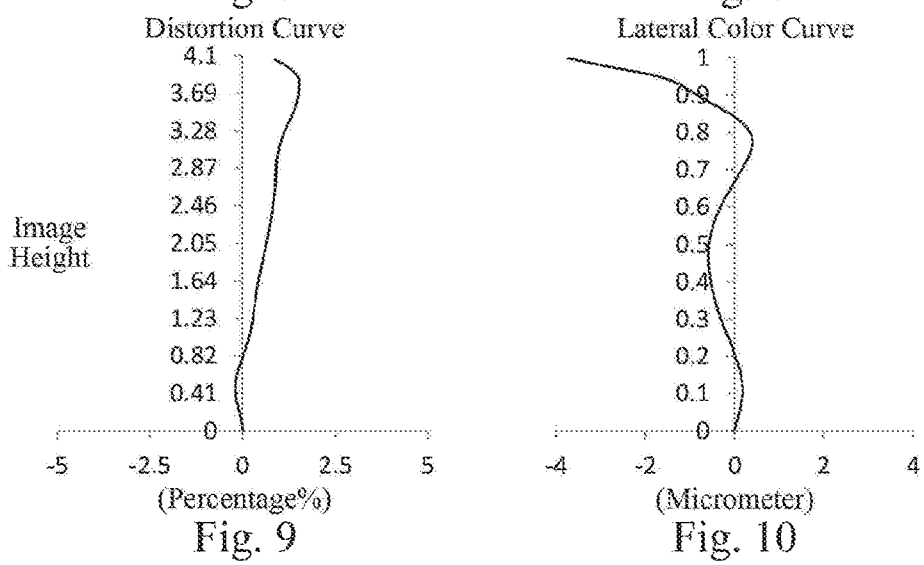

FIG. 7 illustrates a longitudinal aberration curve of the optical imaging system according to Example 2, representing deviations of focal points converged by light of different wavelengths after passing through the optical imaging system. FIG. 8 illustrates an astigmatism curve of the optical imaging system according to Example 2, representing a curvature of a tangential plane and a curvature of a sagittal plane. FIG. 9 illustrates a distortion curve of the optical imaging system according to Example 2, representing amounts of distortion corresponding to different FOVs. FIG. 10 illustrates a lateral color curve of the optical imaging system according to Example 2, representing deviations of different image heights on an image plane after light passes through the optical imaging system. It can be determined from the above description and FIGS. 7 to 10 that the optical imaging lens assembly according to Example 2 is an optical lens assembly having an ultra-large optical imaging surface, which can be used in a 1/2.3-inch chip, and having an ultra-large aperture.

Example 3

An optical imaging lens assembly according to Example 3 of the disclosure is described below with reference to FIGS. 11 to 15.

Figure 11:
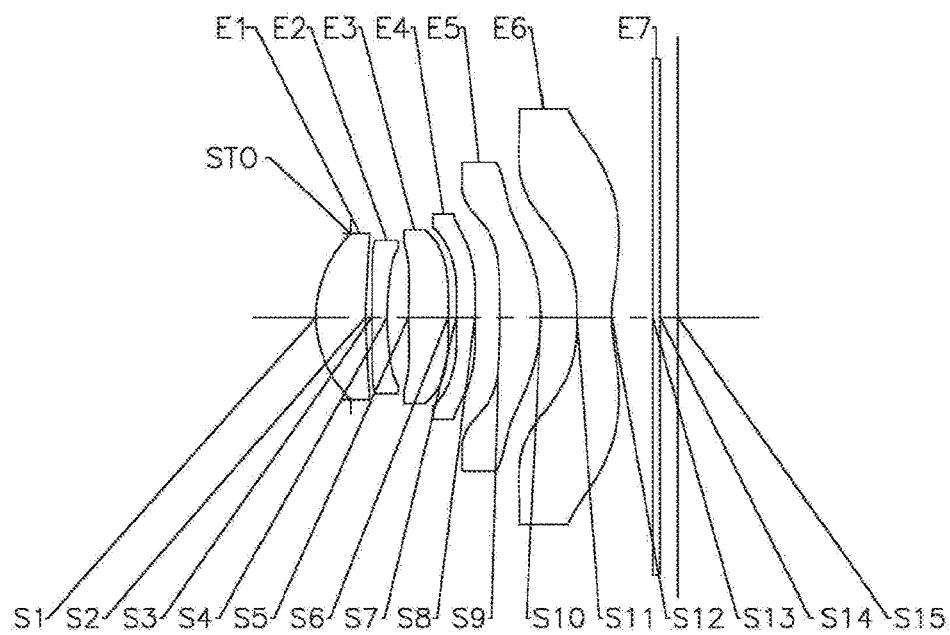
FIG. 11 shows a schematic structural diagram of an optical imaging lens assembly of Example 3.

FIG. 11 is a schematic structural diagram showing the optical imaging lens assembly of Example 3. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be convex. The fourth lens E4 may have a positive refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 7 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 7

| f1 (mm) | 4.04 | f (mm) | 4.57 |
|---|---|---|---|
| f2 (mm) | −9.31 | HFOV (°) | 41.3 |
| f3 (mm) | 25.60 | Fno | 1.79 |
| f4 (mm) | 107.42 | | |
| f5 (mm) | 4.52 | | |
| f6 (mm) | −2.70 | | |

Table 8 below shows the surface type, curvature radius, thickness, refractive index, abbe number, and conic coefficient of each lens in the optical imaging lens assembly of this example, wherein the curvature radius and thickness are expressed in millimeters (mm).

TABLE 8

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5186 | | | |
| S1 | Aspherical | 1.7495 | 0.7489 | 1.55 | 56.1 | −6.5362 |
| S2 | Aspherical | 7.1261 | 0.0913 | | | 3.6922 |
| S3 | Aspherical | 13.5302 | 0.2300 | 1.67 | 20.4 | 74.6304 |
| S4 | Aspherical | 4.2324 | 0.3233 | | | 2.1013 |
| S5 | Aspherical | 14.2337 | 0.5967 | 1.55 | 56.1 | 97.8345 |
| S6 | Aspherical | −800.0000 | 0.1252 | | | 0.0000 |
| S7 | Aspherical | 15.0374 | 0.2781 | 1.67 | 20.4 | 0.0000 |
| S8 | Aspherical | 18.8814 | 0.3718 | | | 28.9047 |
| S9 | Aspherical | −93.1644 | 0.6195 | 1.55 | 56.1 | 0.0000 |

TABLE 8-continued

| Surface No. | Surface Type | Curvature Radius | Thickness | Material Refractive Index | Abbe Number | Conic Coefficient |
|---|---|---|---|---|---|---|
| S10 | Aspherical | −2.4132 | 0.5372 | | | −1.5231 |
| S11 | Aspherical | −5.5110 | 0.5205 | 1.55 | 56.1 | −0.9087 |
| S12 | Aspherical | 2.0773 | 0.6168 | | | −14.5070 |
| S13 | Spherical | Infinite | 0.1100 | 1.52 | 64.2 | |
| S14 | Spherical | Infinite | 0.2710 | | | |
| S15 | Spherical | Infinite | | | | |

Table 9 below shows the high-order coefficients of each of the aspherical surfaces S1-S12 that can be used for respective aspherical lens in this example. Each aspherical surface type may be defined by formula (1) given in Example 1 above.

TABLE 9

| Surface No. | A4 | A6 | A8 | A10 | A12 | A14 | A16 | A18 | A20 |
|---|---|---|---|---|---|---|---|---|---|
| S1 | 1.4157E−01 | −4.4897E−02 | −5.2313E−02 | 1.3856E−01 | −1.1040E−01 | 1.1618E−02 | 3.4910E−02 | −2.0521E−02 | 3.5343E−03 |
| S2 | −7.0300E−02 | 6.6364E−02 | −5.0411E−02 | 1.4087E−01 | −3.5137E−01 | 4.3971E−01 | −2.8869E−01 | 9.5815E−02 | −1.2750E−02 |
| S3 | −1.3864E−01 | 2.8694E−01 | −5.3610E−01 | 1.1601E+00 | −1.9341E+00 | 2.0653E+00 | −1.3100E+00 | 4.4933E−01 | −6.4158E−02 |
| S4 | −8.6263E−02 | 2.3657E−01 | −3.0860E−01 | 1.9829E−01 | 5.3634E−01 | −1.6679E+00 | 2.0218E+00 | −1.1758E+00 | 2.7145E−01 |
| S5 | −8.9697E−02 | 1.9465E−01 | −1.0044E+00 | 3.0053E+00 | −5.5529E+00 | 6.2934E+00 | −4.2381E+00 | 1.5433E+00 | −2.3048E−01 |
| S6 | −1.4099E−01 | −2.5346E−03 | 3.7625E−01 | −1.2250E+00 | 2.0257E+00 | −2.0253E+00 | 1.2316E+00 | −4.1649E−01 | 5.9549E−02 |
| S7 | −2.2458E−01 | 1.0739E−01 | 3.8970E−02 | −2.3179E−01 | 3.4325E−01 | −3.3557E−01 | 2.2544E−01 | −8.6321E−02 | 1.3469E−02 |
| S8 | −1.6849E−01 | 7.8925E−02 | −5.5437E−02 | 7.4329E−02 | −9.1902E−02 | 6.6082E−02 | −2.5101E−02 | 4.6676E−03 | −3.1956E−04 |
| S9 | −1.6359E−02 | −7.9288E−02 | 1.1158E−01 | −1.3649E−01 | 1.1499E−01 | −6.2212E−02 | 2.0179E−02 | −3.4927E−03 | 2.4565E−04 |
| S10 | 3.0617E−02 | −2.7789E−02 | 1.0756E−02 | −7.2445E−03 | 6.6284E−03 | −2.8885E−03 | 6.1885E−04 | −6.4972E−05 | 2.6820E−06 |
| S11 | −1.9310E−01 | 1.3519E−01 | −8.3129E−02 | 3.8348E−02 | −1.0987E−02 | 1.9103E−03 | −1.9778E−04 | 1.1260E−05 | −2.7198E−07 |
| S12 | −7.6295E−02 | 3.2511E−02 | −1.0340E−02 | 2.0770E−03 | −2.3483E−04 | 9.5531E−06 | 7.5053E−07 | −9.4725E−08 | 2.8389E−09 |

Figure 12:
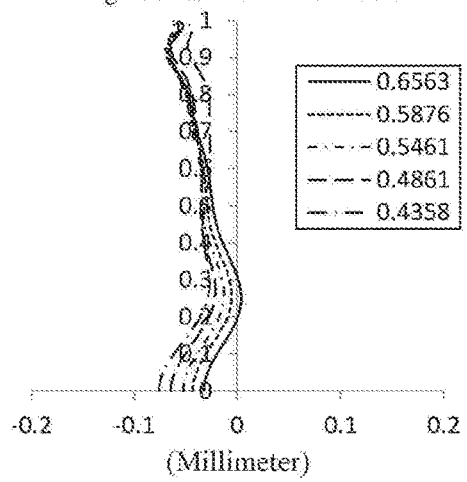
FIGS. 12 to 15 show a longitudinal aberration curve, an astigmatic curve, a distortion curve and a lateral color curve of the optical imaging lens assembly of Example 3, respectively.
Figure 13:
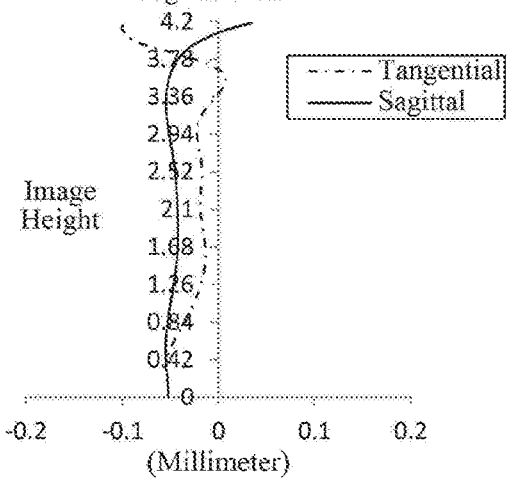
Figure 14:
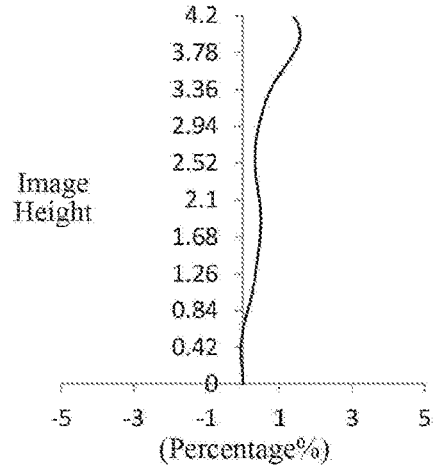
Figure 15:
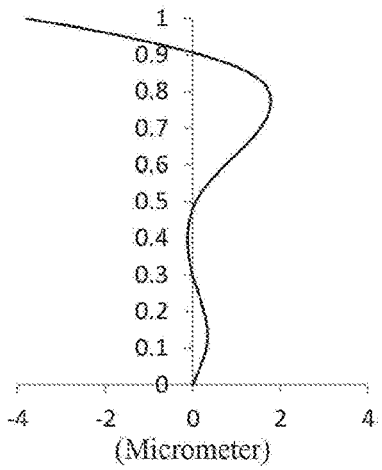

FIG. 12 illustrates a longitudinal aberration curve of the optical imaging system according to Example 3, representing deviations of focal points converged by light of different wavelengths after passing through the optical imaging system. FIG. 13 illustrates an astigmatism curve of the optical imaging system according to Example 3, representing a curvature of a tangential plane and a curvature of a sagittal plane. FIG. 14 illustrates a distortion curve of the optical imaging system according to Example 3, representing amounts of distortion corresponding to different FOVs. FIG. 15 illustrates a lateral color curve of the optical imaging system according to Example 3, representing deviations of different image heights on an image plane after light passes through the optical imaging system. It can be determined from the above description and FIGS. 12 to 15 that the optical imaging lens assembly according to Example 3 is an optical lens assembly having an ultra-large optical imaging surface, which can be used in a 1/2.3-inch chip, and having an ultra-large aperture.

Example 4

An optical imaging lens assembly according to Example 4 of the disclosure is described below with reference to FIGS. 16 to 20.

Figure 16:
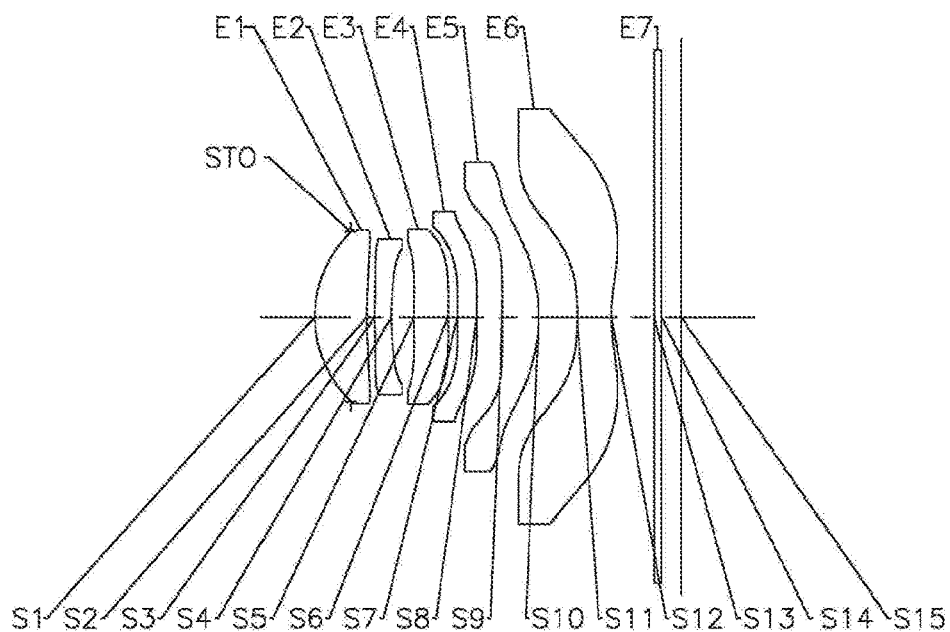
FIG. 16 shows a schematic structural diagram of an optical imaging lens assembly of Example 4.

FIG. 16 is a schematic structural diagram showing the optical imaging lens assembly of Example 4. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be convex, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 10 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 10

| f1 (mm) | 3.99 | f (mm) | 4.75 |
|---|---|---|---|
| f2 (mm) | −9.67 | HFOV (°) | 40.7 |
| f3 (mm) | 360.12 | Fno | 1.86 |
| f4 (mm) | 256.90 | | |
| f5 (mm) | 4.30 | | |
| f6 (mm) | −2.99 | | |

Table 11 below shows the surface type, curvature radius, thickness, refractive index abbe number, and conic coefficient of each lens in the optical imaging lens assembly of this example, wherein the curvature radius and thickness are expressed in millimeters (mm).

TABLE 11

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5456 | | | |
| S1 | Aspherical | 1.7431 | 0.7830 | 1.55 | 56.1 | −6.5137 |
| S2 | Aspherical | 7.3165 | 0.1204 | | | 2.2688 |
| S3 | Aspherical | 13.8020 | 0.2447 | 1.67 | 20.4 | 74.5100 |
| S4 | Aspherical | 4.3702 | 0.3459 | | | 1.9444 |
| S5 | Aspherical | 19.7648 | 0.5086 | 1.55 | 56.1 | 99.0000 |
| S6 | Aspherical | 21.7715 | 0.1419 | | | 0.0000 |

TABLE 11-continued

| Surface No. | Surface Type | Curvature Radius | Thickness | Material Refractive Index | Abbe Number | Conic Coefficient |
|---|---|---|---|---|---|---|
| S7 | Aspherical | 16.0773 | 0.2891 | 1.67 | 20.4 | 0.0000 |
| S8 | Aspherical | 17.6107 | 0.3861 | | | −37.8872 |
| S9 | Aspherical | 85.9980 | 0.5460 | 1.55 | 56.1 | 0.0000 |
| S10 | Aspherical | −2.4101 | 0.5686 | | | −1.3577 |
| S11 | Aspherical | −5.4888 | 0.5140 | 1.55 | 56.1 | −0.8534 |
| S12 | Aspherical | 2.3989 | 0.6411 | | | −16.8720 |
| S13 | Spherical | Infinite | 0.1100 | 1.52 | 64.2 | |
| S14 | Spherical | Infinite | 0.2954 | | | |
| S15 | Spherical | Infinite | | | | |

Table 12 below shows the high-order coefficients of each of the aspherical surfaces S1-S12 that can be used for respective aspherical lens in this example. Each aspherical surface type may be defined by formula (1) given in Example 1 above.

TABLE 12

| Surface No. | A4 | A6 | A8 | A10 | A12 | A14 | A16 | A18 | A20 |
|---|---|---|---|---|---|---|---|---|---|
| S1 | 1.4702E−01 | −6.1899E−02 | −6.0331E−02 | 2.8201E−01 | −4.5198E−01 | 4.1095E−01 | −2.2099E−01 | 6.5449E−02 | −8.3029E−03 |
| S2 | −6.2324E−02 | 3.4300E−02 | 7.2668E−02 | −2.2748E−01 | 3.1526E−01 | −2.6592E−01 | 1.3774E−01 | −4.0060E−02 | 4.9196E−03 |
| S3 | −1.2384E−01 | 1.9884E−01 | −2.3008E−01 | 4.4019E−01 | −8.0023E−01 | 9.2058E−01 | −6.1169E−01 | 2.1704E−01 | −3.1945E−02 |
| S4 | −8.0492E−02 | 2.0512E−01 | −4.0213E−01 | 1.2715E+00 | −2.9866E+00 | 4.3529E+00 | −3.7409E+00 | 1.7450E+00 | −3.3855E−01 |
| S5 | −9.7584E−02 | 1.3081E−01 | −4.5758E−01 | 9.2984E−01 | −1.0389E+00 | 3.7802E−01 | 3.7517E−01 | −4.2967E−01 | 1.2581E−01 |
| S6 | −1.4809E−01 | 9.5116E−02 | −6.2865E−02 | −1.0104E−01 | 3.0984E−01 | −4.2983E−01 | 3.4424E−01 | −1.4513E−01 | 2.4472E−02 |
| S7 | −2.2916E−01 | 1.7879E−01 | −3.2659E−01 | 6.9921E−01 | −1.0189E+00 | 8.5676E−01 | −3.9107E−01 | 8.7364E−02 | −7.0896E−03 |
| S8 | −1.6903E−01 | 7.7617E−02 | −8.9332E−02 | 1.8656E−01 | −2.5540E−01 | 1.9784E−01 | −8.5626E−02 | 1.9512E−02 | −1.8306E−03 |
| S9 | −1.3397E−02 | −8.4628E−02 | 1.2328E−01 | −1.4489E−01 | 1.1532E−01 | −6.1804E−02 | 2.0476E−02 | −2.9716E−03 | 1.9999E−04 |
| S10 | 2.7047E−02 | −3.7577E−02 | 3.0282E−02 | −2.5620E−02 | 1.6283E−02 | −5.8087E−03 | 1.1242E−03 | −1.1149E−04 | 4.4478E−06 |
| S11 | −1.7781E−01 | 1.0908E−01 | −6.1328E−02 | 2.8099E−02 | −8.1031E−03 | 1.4126E−03 | −1.4608E−04 | 8.2882E−06 | −1.9934E−07 |
| S12 | −7.5107E−02 | 2.9069E−02 | −8.3105E−03 | 1.2793E−03 | −1.6386E−05 | −3.0706E−05 | 5.3314E−06 | −3.7880E−07 | 1.0110E−08 |

Figures 17, 18:
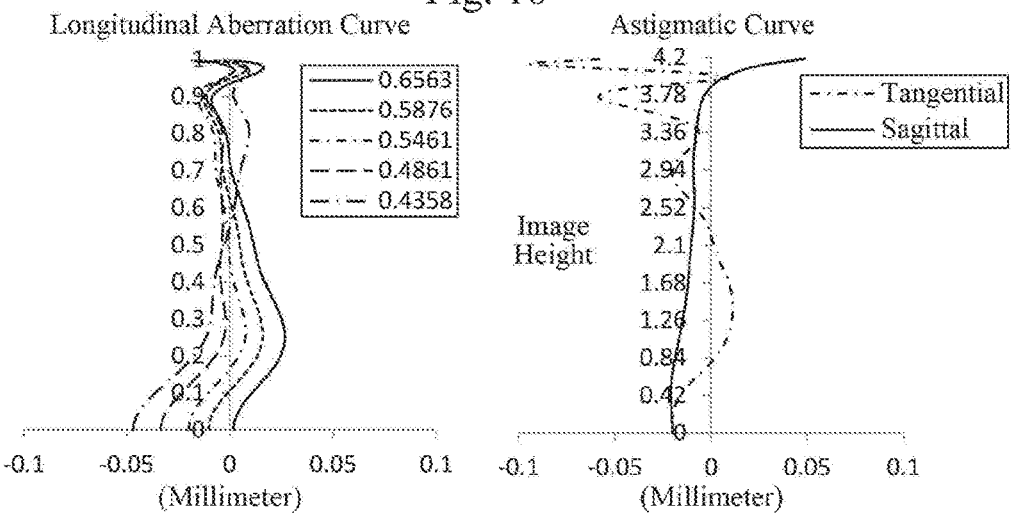
FIGS. 17 to 20 show a longitudinal aberration curve, an astigmatic curve, a distortion curve and a lateral color curve of the optical imaging lens assembly of Example 4, respectively.
Figures 19, 20:
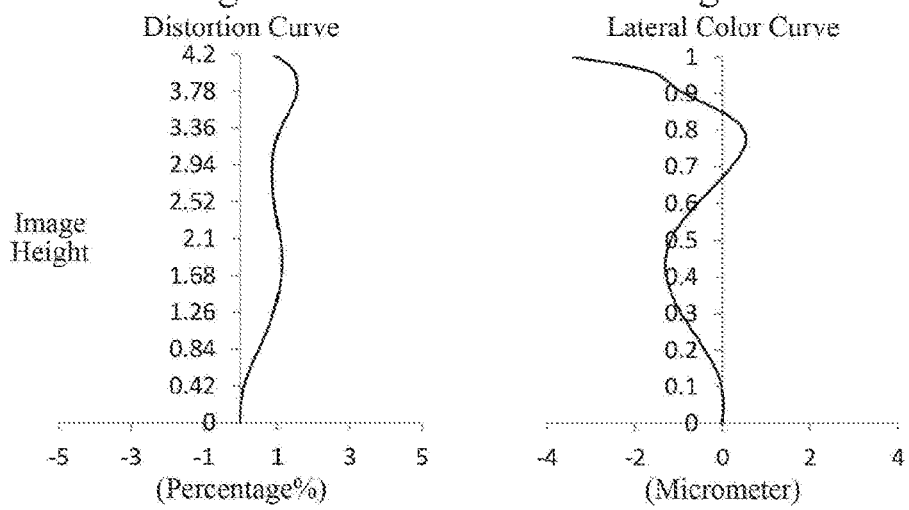

FIG. 17 illustrates a longitudinal aberration curve of the optical imaging system according to Example 4, representing deviations of focal points converged by light of different wavelengths after passing through the optical imaging system. FIG. 18 illustrates an astigmatism curve of the optical imaging system according to Example 4, representing a curvature of a tangential plane and a curvature of a sagittal plane. FIG. 19 illustrates a distortion curve of the optical imaging system according to Example 4, representing amounts of distortion corresponding to different FOVs. FIG. 20 illustrates a lateral color curve of the optical imaging system according to Example 4, representing deviations of different image heights on an image plane after light passes through the optical imaging system. It can be determined from the above description and FIGS. 17 to 20 that the optical imaging lens assembly according to Example 4 is an optical lens assembly having an ultra-large optical imaging surface, which can be used in a 1/2.3-inch chip, and having an ultra-large aperture.

Example 5

An optical imaging lens assembly according to Example 5 of the disclosure is described below with reference to FIGS. 21 to 25.

Figure 21:
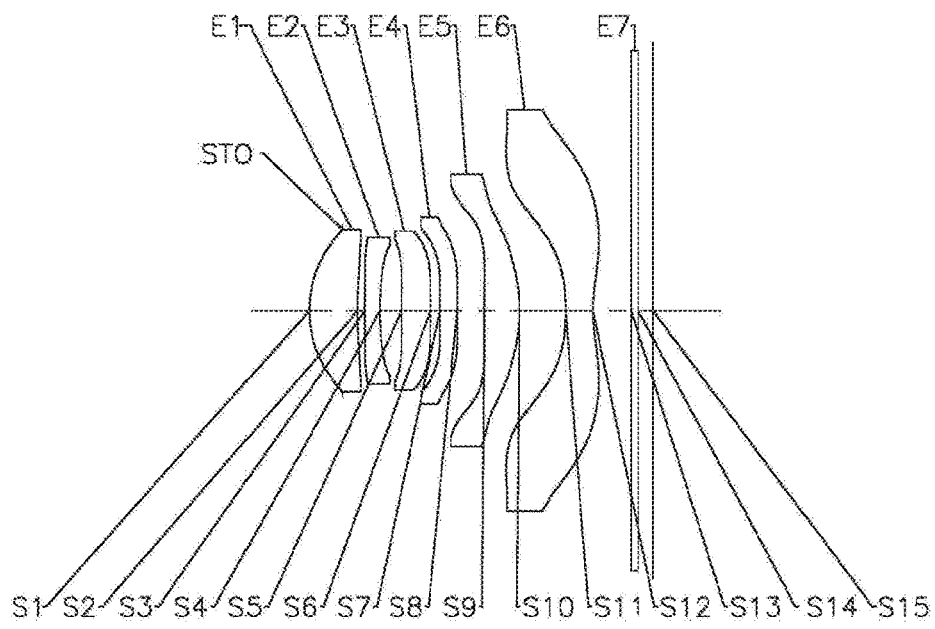
FIG. 21 shows a schematic structural diagram of an optical imaging lens assembly of Example 5.

FIG. 21 is a schematic structural diagram showing the optical imaging lens assembly of Example 5. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be concave. The fourth lens E4 may have a negative refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be convex, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 13 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 13

| f1 (mm) | 4.01 | f (mm) | 4.54 |
|---|---|---|---|
| f2 (mm) | −9.55 | HFOV (°) | 41.3 |
| f3 (mm) | 57.06 | Fno | 1.84 |
| f4 (mm) | −238.90 | | |
| f5 (mm) | 4.18 | | |
| f6 (mm) | −2.78 | | |

Table 14 shows the surface type, curvature radius, thickness, refractive index, abbe number, and conic coefficient of each lens in the optical imaging lens assembly of this example, wherein the curvature radius and thickness are expressed in millimeters (mm).

TABLE 14

| Surface No. | Surface Type | Curvature Radius | Thickness | Material Refractive Index | Abbe Number | Conical Coefficient |
|---|---|---|---|---|---|---|
| OBJ | Spherical | Infinite | Infinite | | | |
| STO | Spherical | Infinite | −0.5051 | | | |
| S1 | Aspherical | 1.7294 | 0.7380 | 1.55 | 56.1 | −6.8388 |
| S2 | Aspherical | 6.9833 | 0.1108 | | | 4.1056 |
| S3 | Aspherical | 12.6206 | 0.2300 | 1.67 | 20.4 | 59.5195 |
| S4 | Aspherical | 4.2082 | 0.3328 | | | 1.1320 |
| S5 | Aspherical | 22.7098 | 0.4410 | 1.55 | 56.1 | 91.3618 |
| S6 | Aspherical | 83.0051 | 0.1433 | | | 0.0000 |
| S7 | Aspherical | 12.0606 | 0.2633 | 1.67 | 20.4 | 0.0000 |
| S8 | Aspherical | 11.1154 | 0.4179 | | | −99.0000 |
| S9 | Aspherical | 25.5059 | 0.5370 | 1.55 | 56.1 | 0.0000 |
| S10 | Aspherical | −2.4885 | 0.6953 | | | −1.3338 |
| S11 | Aspherical | −4.4910 | 0.4203 | 1.54 | 55.9 | −1.6514 |
| S12 | Aspherical | 2.3007 | 0.5833 | | | −18.2742 |
| S13 | Spherical | Infinite | 0.1100 | 1.52 | 64.2 | |
| S14 | Spherical | Infinite | 0.2240 | | | |
| S15 | Spherical | Infinite | | | | |

Table 15 below shows the high-order coefficients of each of the aspherical surfaces S1-S12 that can be used for respective aspherical lens in this example. Each aspherical surface type may be defined by formula (1) given in Example 1 above.

TABLE 15

| Surface No. | A4 | A6 | A8 | A10 | A12 |
|---|---|---|---|---|---|
| S1 | 1.5607E−01 | −5.9042E−02 | −1.2938E−01 | 5.1555E−01 | −8.7306E−01 |
| S2 | −6.9770E−02 | 1.0047E−01 | −2.3321E−01 | 5.8377E−01 | −1.0043E+00 |
| S3 | −1.2166E−01 | 1.9955E−01 | −2.3942E−01 | 4.3632E−01 | −7.6248E−01 |
| S4 | −6.7924E−02 | 1.0882E−01 | 3.0139E−01 | −1.8372E+00 | 5.1014E+00 |
| S5 | −8.1450E−02 | 4.9906E−02 | −2.4198E−01 | 5.9057E−01 | −9.9863E−01 |
| S6 | −1.4088E−01 | 1.0994E−01 | −1.3065E−01 | −5.7497E−02 | 3.6279E−01 |
| S7 | −2.3472E−01 | 1.7083E−01 | −2.7391E−01 | 5.7740E−01 | −9.2231E−01 |
| S8 | −1.7358E−01 | 6.6333E−02 | −4.4093E−02 | 9.6535E−02 | −1.6262E−01 |
| S9 | −1.4118E−04 | −9.4436E−02 | 1.3706E−01 | −1.7036E−01 | 1.3864E−01 |
| S10 | 4.8426E−02 | −5.1518E−02 | 4.3902E−02 | −4.1601E−02 | 2.6587E−02 |
| S11 | −1.9280E−01 | 1.4216E−01 | −8.8445E−02 | 4.0433E−02 | −1.1510E−02 |
| S12 | −8.6214E−02 | 4.2540E−02 | −1.6451E−02 | 4.3047E−03 | −7.2801E−04 |

| Surface No. | A14 | A16 | A18 | A20 |
|---|---|---|---|---|
| S1 | 8.6177E−01 | −5.0700E−01 | 1.6463E−01 | −2.2800E−02 |
| S2 | 1.0562E+00 | −6.5249E−01 | 2.1738E−01 | −3.0206E−02 |
| S3 | 8.6512E−01 | −5.6243E−01 | 1.9042E−01 | −2.5782E−02 |
| S4 | −8.3200E+00 | 8.0247E+00 | −4.2076E+00 | 9.2456E−01 |
| S5 | 1.0267E+00 | −5.7832E−01 | 1.4350E−01 | −4.2979E−03 |
| S6 | −5.7378E−01 | 4.8735E−01 | −2.1230E−01 | 3.6380E−02 |
| S7 | 8.5281E−01 | −4.2545E−01 | 1.0564E−01 | −1.0283E−02 |
| S8 | 1.4580E−01 | −7.0056E−02 | 1.7283E−02 | −1.7109E−03 |
| S9 | −6.9965E−02 | 2.0925E−02 | −3.3528E−03 | 2.2019E−04 |
| S10 | −9.4182E−03 | 1.8261E−03 | −1.8290E−04 | 7.4129E−06 |
| S11 | 1.9982E−03 | −2.0734E−04 | 1.1863E−05 | −2.8867E−07 |
| S12 | 7.5029E−05 | −4.2388E−06 | 1.0100E−07 | −7.2914E−11 |

Figure 22:
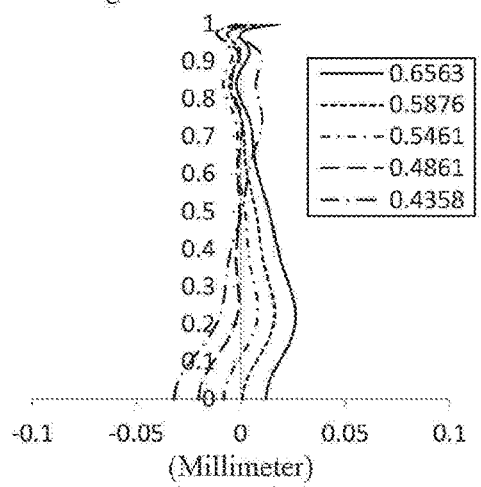
FIGS. 22 to 25 show a longitudinal aberration curve, an astigmatic curve, a distortion curve and a lateral color curve of the optical imaging lens assembly of Example 5, respectively.
Figure 23:
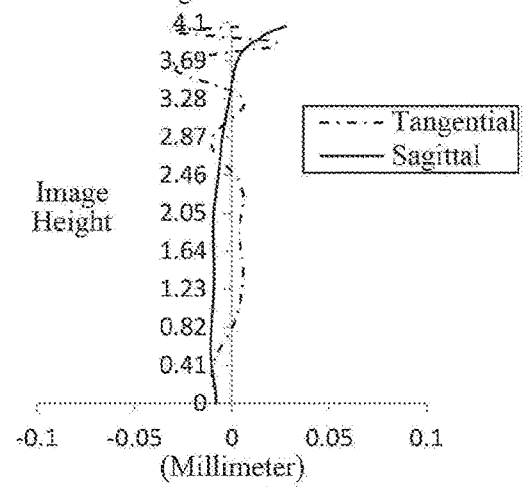
Figure 24:
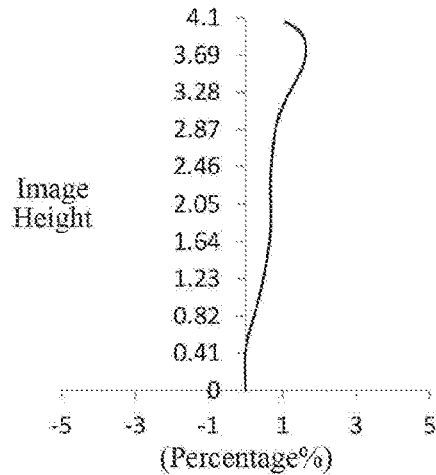
Figure 25:
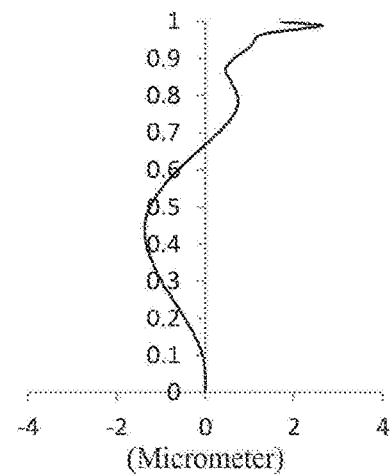

FIG. 22 illustrates a longitudinal aberration curve of the optical imaging system according to Example 5, representing deviations of focal points converged by light of different wavelengths after passing through the optical imaging system. FIG. 23 illustrates an astigmatism curve of the optical imaging system according to Example 5, representing a curvature of a tangential plane and a curvature of a sagittal plane. FIG. 24 illustrates a distortion curve of the optical imaging system according to Example 5, representing amounts of distortion corresponding to different FOVs. FIG. 25 illustrates a lateral color curve of the optical imaging system according to Example 5, representing deviations of different image heights on an image plane after light passes through the optical imaging system. It can be determined from the above description and FIGS. 22 to 25 that the optical imaging lens assembly according to Example 5 is an optical lens assembly having an ultra-large optical imaging surface, which can be used in a 1/2.3-inch chip, and having an ultra-large aperture.

Example 6

An optical imaging lens assembly according to Example 6 of the disclosure is described below with reference to FIGS. 26 to 30.

Figure 26:
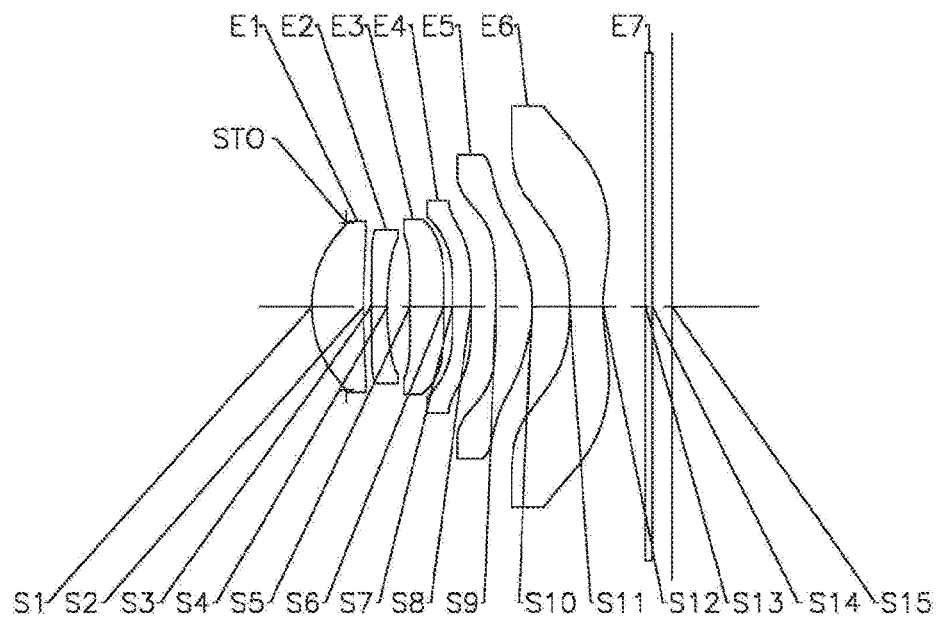
FIG. 26 shows a schematic structural diagram of an optical imaging lens assembly of Example 6.

FIG. 26 is a schematic structural diagram showing the optical imaging lens assembly of Example 6. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a negative refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 16 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 16

| f1 (mm) | 3.99 | f (mm) | 4.77 |
|---|---|---|---|
| f2 (mm) | −9.53 | HFOV (°) | 40.5 |
| f3 (mm) | −1.22E+04 | Fno | 1.87 |
| f4 (mm) | 85.61 | | |
| f5 (mm) | 4.44 | | |
| f6 (mm) | −3.04 | | |

Table 17 below shows the surface type, curvature radius, thickness, refractive index, abbe number, and conic coefficient of each lens in the optical imaging lens assembly of this example, wherein the curvature radius and thickness are expressed in millimeters (mm).

TABLE 17

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5517 | | | |
| S1 | Aspherical | 1.7437 | 0.7902 | 1.55 | 56.1 | −6.5255 |
| S2 | Aspherical | 7.3467 | 0.1215 | | | 2.1523 |
| S3 | Aspherical | 13.9413 | 0.2446 | 1.67 | 20.4 | 75.3359 |
| S4 | Aspherical | 4.3413 | 0.3474 | | | 2.1007 |
| S5 | Aspherical | 18.6691 | 0.5135 | 1.55 | 56.1 | 98.6705 |
| S6 | Aspherical | 18.4360 | 0.1351 | | | 0.0000 |
| S7 | Aspherical | 14.6239 | 0.2808 | 1.67 | 20.4 | 0.0000 |
| S8 | Aspherical | 19.4945 | 0.3832 | | | −49.3904 |
| S9 | Aspherical | −100.0000 | 0.5442 | 1.55 | 56.1 | 0.0000 |
| S10 | Aspherical | −2.3720 | 0.5758 | | | −1.3908 |
| S11 | Aspherical | −5.5187 | 0.5106 | 1.55 | 56.1 | −0.7802 |
| S12 | Aspherical | 2.4520 | 0.6480 | | | −16.7663 |
| S13 | Spherical | Infinite | 0.1100 | 1.52 | 64.2 | |
| S14 | Spherical | Infinite | 0.3023 | | | |
| S15 | Spherical | Infinite | | | | |

Table 18 below shows the high-order coefficients of each of the aspherical surfaces S1-S12 that can be used for respective aspherical lens in this example. Each aspherical surface type may be defined by formula (1) given in Example 1 above.

TABLE 18

| Surface No. | A4 | A6 | A8 | A10 | A12 |
|---|---|---|---|---|---|
| S1 | 1.4738E−01 | −6.5848E−02 | −4.2875E−02 | 2.3771E−01 | −3.8489E−01 |
| S2 | −6.1396E−02 | 2.5482E−02 | 1.1091E−01 | −3.2031E−01 | 4.4902E−01 |
| S3 | −1.2448E−01 | 1.9986E−01 | −2.2338E−01 | 4.1122E−01 | −7.4491E−01 |
| S4 | −8.0850E−02 | 2.0126E−01 | −3.5984E−01 | 1.0999E+00 | −2.5887E+00 |
| S5 | −9.8260E−02 | 1.5384E−01 | −6.2319E−01 | 1.5593E+00 | −2.4305E+00 |
| S6 | −1.4797E−01 | 7.4831E−02 | 4.5009E−02 | −3.8710E−01 | 7.6025E−01 |
| S7 | −2.2751E−01 | 1.5829E−01 | −2.4012E−01 | 4.9511E−01 | −7.1608E−01 |
| S8 | −1.6644E−01 | 7.2860E−02 | −8.1450E−02 | 1.7638E−01 | −2.4545E−01 |
| S9 | −1.4196E−02 | −7.8139E−02 | 1.0694E−01 | −1.2631E−01 | 1.0432E−01 |
| S10 | 2.5717E−02 | −3.3816E−02 | 2.3501E−02 | −1.9708E−02 | 1.3660E−02 |
| S11 | −1.7218E−01 | 1.0369E−01 | −5.9885E−02 | 2.8296E−02 | −8.3042E−03 |
| S12 | −7.5849E−02 | 2.9137E−02 | −8.4320E−03 | 1.2962E−03 | −1.7363E−06 |

TABLE 18-continued

| Surface No. | A14 | A16 | A18 | A20 |
|---|---|---|---|---|
| S1 | 3.4869E−01 | −1.8621E−01 | 5.4686E−02 | −6.8804E−03 |
| S2 | −3.8247E−01 | 1.9757E−01 | −5.6599E−02 | 6.8080E−03 |
| S3 | 8.5981E−01 | −5.7291E−01 | 2.0380E−01 | −3.0091E−02 |
| S4 | 3.7938E+00 | −3.2725E+00 | 1.5303E+00 | −2.9718E−01 |
| S5 | 2.2360E+00 | −1.1022E+00 | 2.1458E−01 | 7.1636E−03 |
| S6 | −8.6504E−01 | 5.9549E−01 | −2.2420E−01 | 3.4863E−02 |
| S7 | 5.7291E−01 | −2.2970E−01 | 3.6880E−02 | −4.3905E−04 |
| S8 | 1.9091E−01 | −8.2556E−02 | 1.8754E−02 | −1.7517E−03 |
| S9 | −5.5555E−02 | 1.7694E−02 | −3.0010E−03 | 2.0667E−04 |
| S10 | −5.1628E−03 | 1.0343E−03 | −1.0486E−04 | 4.2466E−06 |
| S11 | 1.4628E−03 | −1.5232E−04 | 8.6848E−06 | −2.0965E−07 |
| S12 | −3.6676E−05 | 6.2830E−06 | −4.5028E−07 | 1.2200E−08 |

Figure 27:
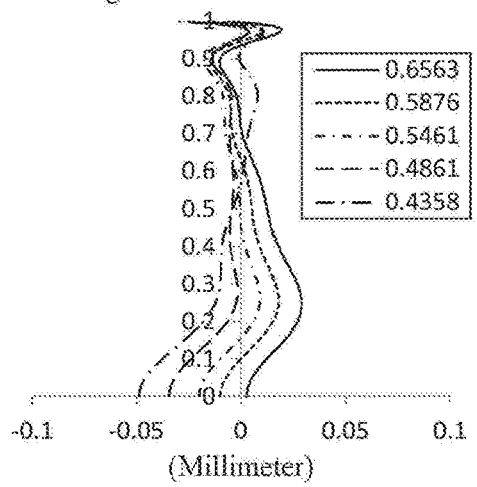
FIGS. 27 to 30 show a longitudinal aberration curve, an astigmatic curve, a distortion curve and a lateral color curve of the optical imaging lens assembly of Example 6, respectively.
Figure 28:
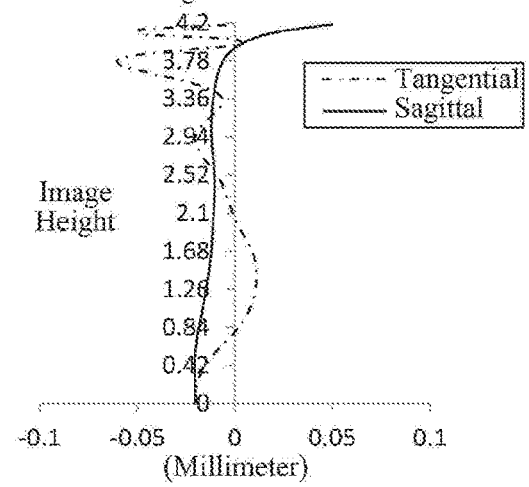
Figure 29:
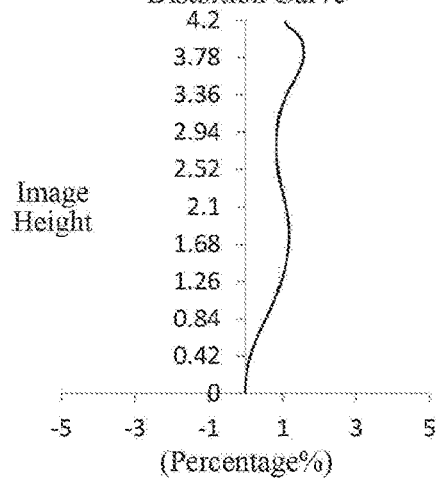
Figure 30:
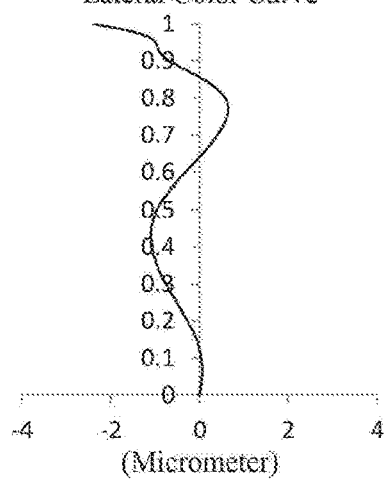

FIG. 27 illustrates a longitudinal aberration curve of the optical imaging system according to Example 6, representing deviations of focal points converged by light of different wavelengths after passing through the optical imaging system. FIG. 28 illustrates an astigmatism curve of the optical imaging system according to Example 6, representing a curvature of a tangential plane and a curvature of a sagittal plane. FIG. 29 illustrates a distortion curve of the optical imaging system according to Example 6, representing amounts of distortion corresponding to different FOVs. FIG. 30 illustrates a lateral color curve of the optical imaging system according to Example 6, representing deviations of different image heights on an image plane after light passes through the optical imaging system. It can be determined from the above description and FIGS. 27 to 30 that the optical imaging lens assembly according to Example 6 is an optical lens assembly having an ultra-large optical imaging surface, which can be used in a 1/2.3-inch chip, and having an ultra-large aperture.

Example 7

An optical imaging lens assembly according to Example 7 of the disclosure is described below with reference to FIGS. 31 to 35.

Figure 31:
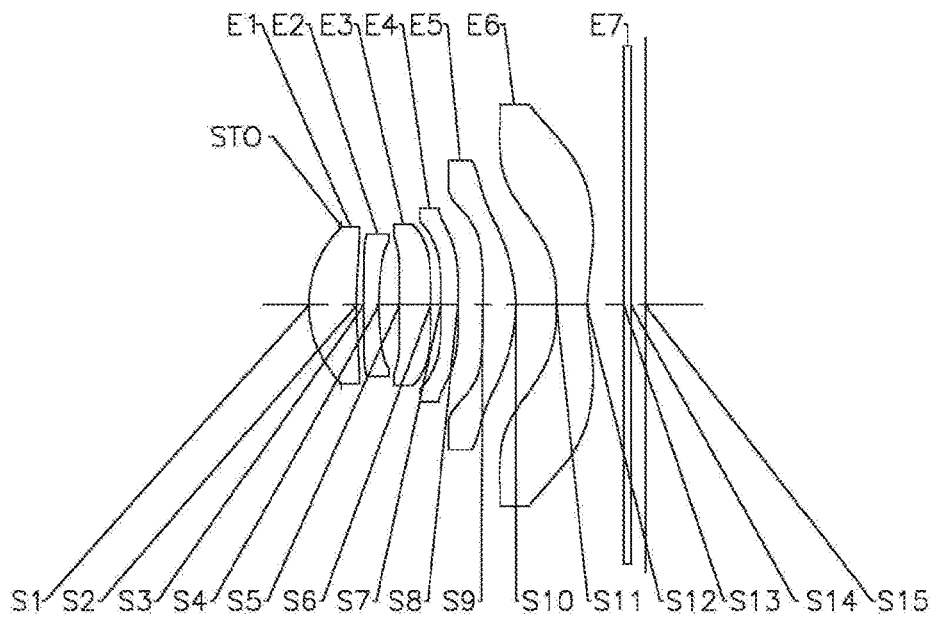
FIG. 31 shows a schematic structural diagram of an optical imaging lens assembly of Example 7.

FIG. 31 is a schematic structural diagram showing the optical imaging lens assembly of Example 7. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 19 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 19

| f1 (mm) | 3.85 | f (mm) | 4.57 |
|---|---|---|---|
| f2 (mm) | −9.45 | HFOV (°) | 41.3 |
| f3 (mm) | 75.65 | Fno | 1.92 |
| f4 (mm) | 205.73 | | |
| f5 (mm) | 4.37 | | |
| f6 (mm) | −2.61 | | |

Table 20 below shows the surface type, curvature radius, thickness, refractive index abbe number, and conic coefficient of each lens in the optical imaging lens assembly of this example, wherein the curvature radius and thickness are expressed in millimeters (mm).

TABLE 20

| | | | | Material | | |
|---|---|---|---|---|---|---|
| Surface No. | Surface Type | Curvature Radius | Thickness | Refractive Index | Abbe Number | Conic Coefficient |
| OBJ | Spherical | Infinite | Infinite | | | |
| STO | Spherical | Infinite | −0.4960 | | | |
| S1 | Aspherical | 1.6637 | 0.7309 | 1.55 | 56.1 | −6.2636 |
| S2 | Aspherical | 6.7498 | 0.1087 | | | 0.7654 |
| S3 | Aspherical | 12.2803 | 0.2320 | 1.67 | 20.4 | 72.8264 |
| S4 | Aspherical | 4.1400 | 0.3146 | | | 3.0799 |
| S5 | Aspherical | 18.3563 | 0.4768 | 1.55 | 56.1 | 70.8384 |
| S6 | Aspherical | 32.7180 | 0.1540 | | | 0.0000 |
| S7 | Aspherical | 12.3721 | 0.2600 | 1.67 | 20.4 | 0.0000 |
| S8 | Aspherical | 13.4802 | 0.3889 | | | −25.3385 |

TABLE 20-continued

| Surface No. | Surface Type | Curvature Radius | Thickness | Material Refractive Index | Abbe Number | Conic Coefficient |
|---|---|---|---|---|---|---|
| S9 | Aspherical | −72.5486 | 0.4993 | 1.55 | 56.1 | 0.0000 |
| S10 | Aspherical | −2.3172 | 0.6155 | | | −1.3969 |
| S11 | Aspherical | −5.5388 | 0.4657 | 1.54 | 55.9 | −0.6648 |
| S12 | Aspherical | 1.9340 | 0.5658 | | | −17.5780 |
| S13 | Spherical | Infinite | 0.1100 | 1.52 | 64.2 | |
| S14 | Spherical | Infinite | 0.2199 | | | |
| S15 | Spherical | Infinite | | | | |

Table 21 below shows the high-order coefficients of the aspherical surfaces S1-S12 that can be used for respective aspherical lens in this example. Each aspherical surface type may be defined by formula (1) given in Example 1 above

TABLE 21

| Surface No. | A4 | A6 | A8 | A10 | A12 |
|---|---|---|---|---|---|
| S1 | 1.6988E−01 | −1.2319E−01 | 1.4146E−01 | −1.5883E−01 | 1.6685E−01 |
| S2 | −8.0556E−02 | 1.2528E−01 | −2.6226E−01 | 5.8063E−01 | −9.1209E−01 |
| S3 | −1.3900E−01 | 2.3263E−01 | −2.4502E−01 | 4.1720E−01 | −8.0547E−01 |
| S4 | −9.5823E−02 | 3.0933E−01 | −7.7152E−01 | 2.0910E+00 | −3.8467E+00 |
| S5 | −1.0449E−01 | 1.6657E−01 | −8.2175E−01 | 2.5564E+00 | −5.1520E+00 |
| S6 | −1.6719E−01 | 1.8439E−01 | −3.2907E−01 | 2.9304E−01 | 3.4214E−02 |
| S7 | −2.4925E−01 | 1.5197E−01 | −8.2762E−02 | −1.2565E−01 | 1.1502E−01 |
| S8 | −1.9238E−01 | 8.2614E−02 | −5.1910E−02 | 9.8666E−02 | −1.6006E−01 |
| S9 | −1.4399E−02 | −1.1343E−01 | 2.0742E−01 | −2.8297E−01 | 2.4548E−01 |
| S10 | 2.8764E−02 | −4.9831E−02 | 7.3889E−02 | −7.6005E−02 | 4.6159E−02 |
| S11 | −2.7074E−01 | 2.3930E−01 | −1.4162E−01 | 5.6856E−02 | −1.4629E−02 |
| S12 | −9.9994E−02 | 5.2989E−02 | −1.8178E−02 | 3.4886E−03 | −2.7169E−04 |

| Surface No. | A14 | A16 | A18 | A20 |
|---|---|---|---|---|
| S1 | −1.3665E−01 | 7.1983E−02 | −2.0275E−02 | 2.0109E−03 |
| S2 | 8.8779E−01 | −5.0677E−01 | 1.5382E−01 | −1.9106E−02 |
| S3 | 1.0244E+00 | −7.4190E−01 | 2.8143E−01 | −4.3645E−02 |
| S4 | 4.3071E+00 | −2.6895E+00 | 7.9272E−01 | −5.7494E−02 |
| S5 | 6.4792E+00 | −4.8824E+00 | 2.0000E+00 | −3.3625E−01 |
| S6 | −4.5560E−01 | 5.3406E−01 | −2.6851E−01 | 5.0828E−02 |
| S7 | −2.2461E−01 | 2.3300E−01 | −1.1460E−01 | 2.0860E−02 |
| S8 | 1.4254E−01 | −6.7524E−02 | 1.6239E−02 | −1.5597E−03 |
| S9 | −1.3361E−01 | 4.3701E−02 | −7.7183E−03 | 5.6039E−04 |
| S10 | −1.5911E−02 | 3.0821E−03 | −3.1345E−04 | 1.3022E−05 |
| S11 | 2.3690E−03 | −2.3403E−04 | 1.2909E−05 | −3.0519E−07 |
| S12 | −2.4762E−05 | 7.3535E−06 | −6.0197E−07 | 1.7428E−08 |

Figure 32:
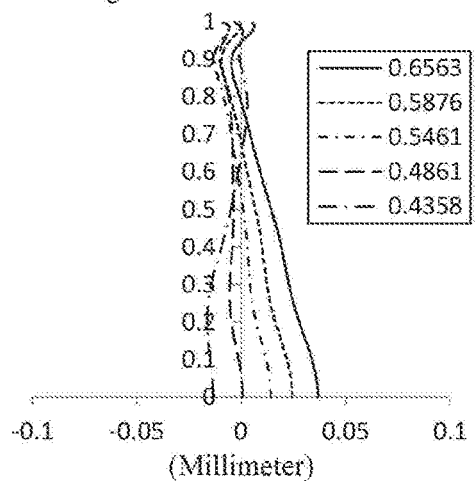
FIGS. 32 to 35 show a longitudinal aberration curve, an astigmatic curve, a distortion curve and a lateral color curve of the optical imaging lens assembly of Example 7, respectively.
Figure 33:
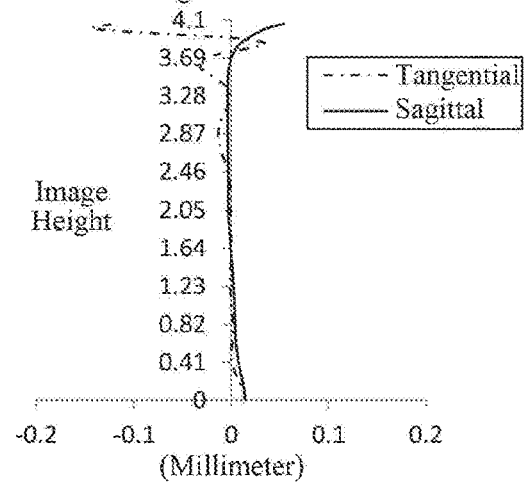
Figure 34:
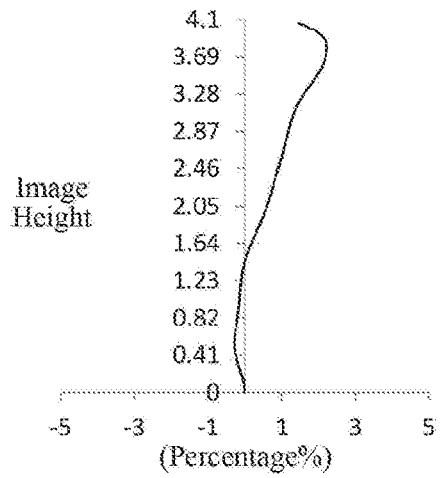
Figure 35:
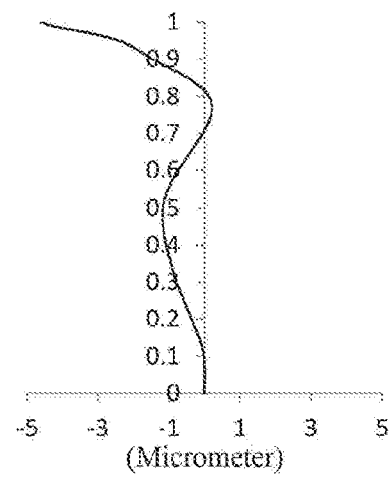

FIG. 32 illustrates a longitudinal aberration curve of the optical imaging system according to Example 7, representing deviations of focal points converged by light of different wavelengths after passing through the optical imaging system. FIG. 33 illustrates an astigmatism curve of the optical imaging system according to Example 7, representing a curvature of a tangential plane and a curvature of a sagittal plane. FIG. 34 illustrates a distortion curve of the optical imaging system according to Example 7, representing amounts of distortion corresponding to different FOVs. FIG. 35 illustrates a lateral color curve of the optical imaging system according to Example 7, representing deviations of different image heights on an image plane after light passes through the optical imaging system. It can be determined from the above description and FIGS. 31 to 35 that the optical imaging lens assembly according to Example 7 is an optical lens assembly having an ultra-large optical imaging surface, which can be used in a 1/2.3-inch chip, and having an ultra-large aperture.

Example 8

An optical imaging lens assembly according to Example 8 of the disclosure is described below with reference to FIGS. 36 to 40.

Figure 36:
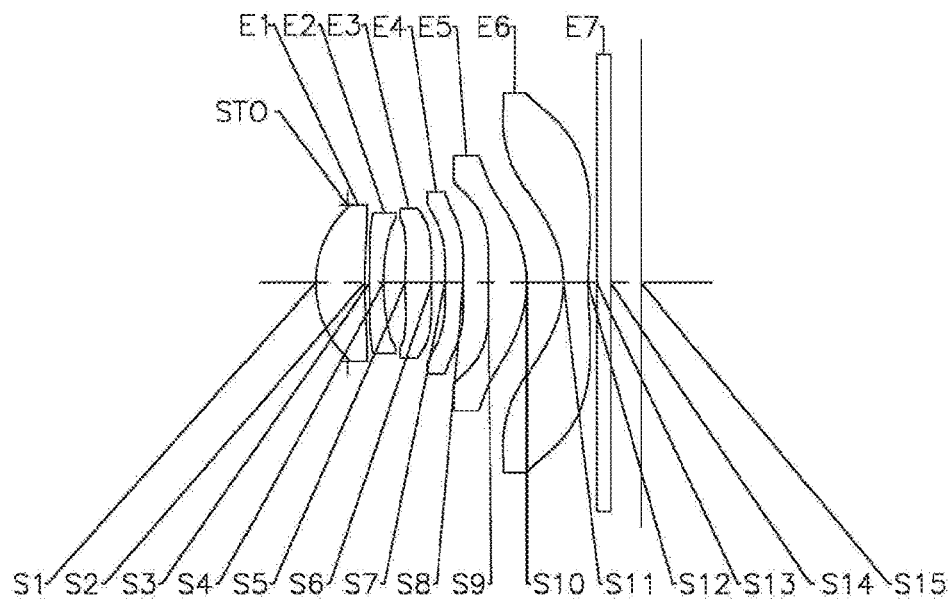
FIG. 36 shows a schematic structural diagram of an optical imaging lens assembly of Example 8.

FIG. 36 is a schematic structural diagram showing the optical imaging lens assembly of Example 8. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be concave. The fourth lens E4 may have a negative refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be convex, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 22 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 22

| f1 (mm) | 3.60 | f (mm) | 4.22 |
|---|---|---|---|
| f2 (mm) | −8.70 | HFOV (°) | 40.2 |
| f3 (mm) | 32.55 | Fno | 1.80 |
| f4 (mm) | −30.43 | | |
| f5 (mm) | 3.15 | | |
| f6 (mm) | −2.26 | | |

Table 23 below shows the surface type, curvature radius, thickness, refractive index, abbe number, and conic coefficient of each lens in the optical imaging lens assembly of this example, wherein the curvature radius and thickness are expressed in millimeters (mm).

TABLE 23

| Surface No. | Surface Type | Curvature Radius | Thickness | Refractive Index | Abbe Number | Conic Coefficient |
|---|---|---|---|---|---|---|
| OBJ | Spherical | Infinite | Infinite | | | |
| STO | Spherical | Infinite | −0.4800 | | | |
| S1 | Aspherical | 1.5761 | 0.7377 | 1.55 | 56.1 | −0.9599 |
| S2 | Aspherical | 6.6088 | 0.0689 | | | 1.0619 |
| S3 | Aspherical | 6.4722 | 0.2136 | 1.67 | 20.4 | −0.0626 |
| S4 | Aspherical | 3.0168 | 0.3300 | | | 1.1193 |
| S5 | Aspherical | 10.3773 | 0.3953 | 1.55 | 56.1 | 23.9968 |
| S6 | Aspherical | 24.6066 | 0.1999 | | | 80.0000 |
| S7 | Aspherical | 13.7750 | 0.2747 | 1.67 | 20.4 | −64.4979 |
| S8 | Aspherical | 8.1339 | 0.3748 | | | 29.8814 |
| S9 | Aspherical | 20.2183 | 0.5763 | 1.55 | 56.1 | 80.0000 |
| S10 | Aspherical | −1.8624 | 0.5504 | | | −0.9227 |
| S11 | Aspherical | −1.6082 | 0.3650 | 1.55 | 56.1 | −4.5231 |
| S12 | Aspherical | 5.6915 | 0.1332 | | | 0.9598 |
| S13 | Spherical | Infinite | 0.2100 | 1.52 | 64.2 | |
| S14 | Spherical | Infinite | 0.4602 | | | |
| S15 | Spherical | Infinite | | | | |

Table 24 below shows the high-order coefficients of each of the aspherical surfaces S1-S12 that can be used for respective aspherical lens in this example. Each aspherical surface type may be defined by formula (1) given in Example 1 above.

TABLE 24

| Surface No. | A4 | A6 | A8 | A10 | A12 |
|---|---|---|---|---|---|
| S1 | 3.2350E−02 | 1.2835E−02 | 1.5356E−02 | −1.2721E−01 | 3.6214E−01 |
| S2 | −1.4495E−01 | 2.5591E−01 | −1.8342E−01 | −3.9925E−01 | 1.5362E+00 |
| S3 | −2.3653E−01 | 4.6069E−01 | −2.5783E−01 | −9.7043E−01 | 3.3158E+00 |
| S4 | −1.2528E−01 | 1.9091E−01 | 8.4586E−01 | −5.4610E+00 | 1.6077E+01 |
| S5 | −7.3489E−02 | −3.9430E−01 | 2.7931E+00 | −1.1338E+01 | 2.7472E+01 |
| S6 | −1.7422E−01 | 7.5858E−02 | 3.0097E−01 | −1.8953E+00 | 4.3614E+00 |
| S7 | −3.4181E−01 | 1.8941E−01 | 3.0194E−01 | −1.5023E+00 | 2.7389E+00 |
| S8 | −3.2786E−01 | 1.9701E−01 | 4.5788E−03 | −3.5164E−01 | 6.1242E−01 |
| S9 | −1.0303E−01 | −6.1173E−02 | 1.0868E−01 | −1.4519E−01 | 1.2509E−01 |
| S10 | 3.3831E−02 | −7.3229E−02 | 8.1462E−02 | −7.4813E−02 | 5.2353E−02 |
| S11 | −1.2306E−01 | 9.3168E−02 | −5.1387E−02 | 2.2184E−02 | −6.3424E−03 |
| S12 | −9.3635E−02 | 5.6251E−02 | −2.8276E−02 | 9.4926E−03 | −2.1230E−03 |

| Surface No. | A14 | A16 | A18 | A20 |
|---|---|---|---|---|
| S1 | −5.2818E−01 | 4.2470E−01 | −1.7907E−01 | 3.0425E−02 |
| S2 | −2.4368E+00 | 2.1207E+00 | −9.7925E−01 | 1.8727E−01 |
| S3 | −5.1473E+00 | 4.5192E+00 | −2.1405E+00 | 4.2554E−01 |
| S4 | −2.7843E+01 | 2.8797E+01 | −1.6410E+01 | 3.9789E+00 |
| S5 | −4.1436E+01 | 3.8034E+01 | −1.9440E+01 | 4.2408E+00 |
| S6 | −5.7411E+00 | 4.4988E+00 | −1.9229E+00 | 3.4075E−01 |
| S7 | −2.9031E+00 | 1.9395E+00 | −7.4746E−01 | 1.2295E−01 |
| S8 | −5.4682E−01 | 2.8865E−01 | −8.5359E−02 | 1.0786E−02 |

TABLE 24-continued

| | | | | |
|---|---|---|---|---|
| S9 | −5.7336E−02 | 9.6542E−03 | 1.2768E−03 | −4.4587E−04 |
| S10 | −2.1988E−02 | 5.1798E−03 | −6.3565E−04 | 3.1670E−05 |
| S11 | 1.1331E−03 | −1.2207E−04 | 7.2758E−06 | −1.8473E−07 |
| S12 | 3.1150E−04 | −2.8869E−05 | 1.5334E−06 | −3.5370E−08 |

Figure 37:
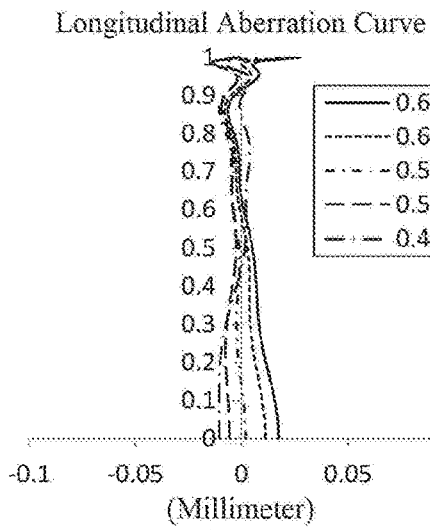
FIGS. 37 to 40 show a longitudinal aberration curve, an astigmatic curve, a distortion curve and a lateral color curve of the optical imaging lens assembly of Example 8, respectively.
Figure 38:
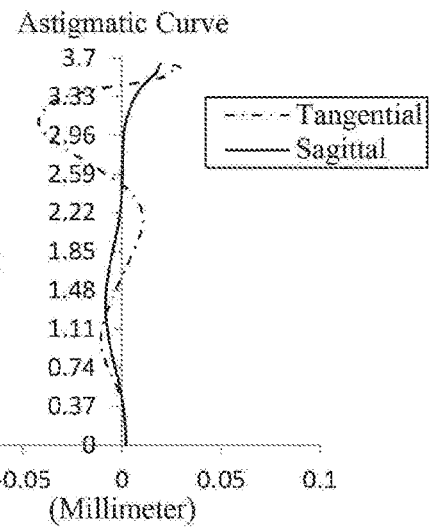
Figure 39:
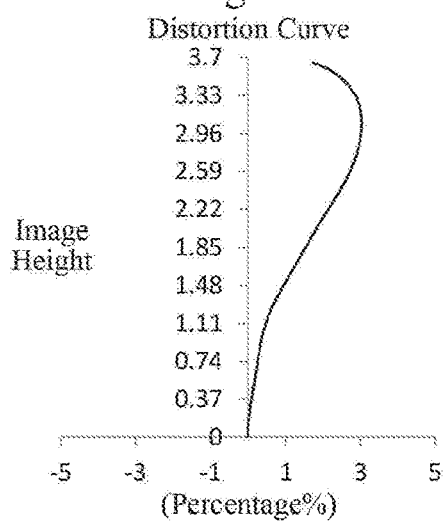
Figure 40:
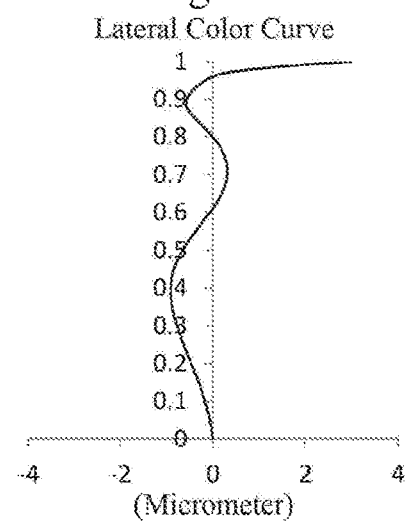

FIG. 37 illustrates a longitudinal aberration curve of the optical imaging system according to Example 8, representing deviations of focal points converged by light of different wavelengths after passing through the optical imaging system. FIG. 38 illustrates an astigmatism curve of the optical imaging system according to Example 8, representing a curvature of a tangential plane and a curvature of a sagittal plane. FIG. 39 illustrates a distortion curve of the optical imaging system according to Example 8, representing amounts of distortion corresponding to different FOVs. FIG. 40 illustrates a lateral color curve of the optical imaging system according to Example 8, representing deviations of different image heights on an image plane after light passes through the optical imaging system. It can be determined from the above description and FIGS. 36 to 40 that the optical imaging lens assembly according to Example 8 is an optical lens assembly having an ultra-large optical imaging surface, which can be used in a 1/2.3-inch chip, and having an ultra-large aperture.

Example 9

An optical imaging lens assembly according to Example 9 of the disclosure is described below with reference to FIGS. 41 to 45.

Figure 41:
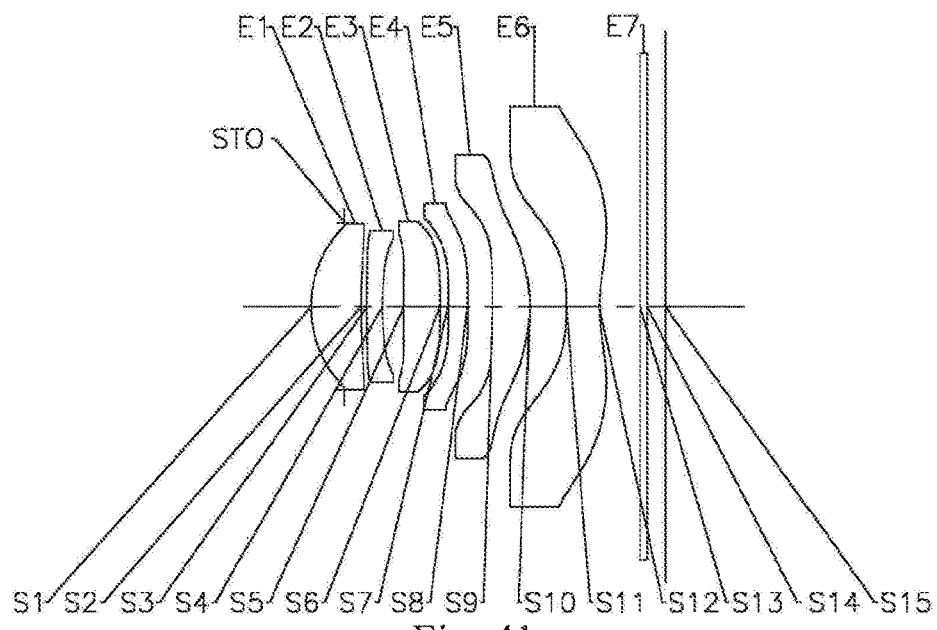
FIG. 41 shows a schematic structural diagram of an optical imaging lens assembly of Example 9.

FIG. 41 is a schematic structural diagram showing the optical imaging lens assembly of Example 9. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 25 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 25

| | | | |
|---|---|---|---|
| f1 (mm) | 4.01 | f (mm) | 4.65 |
| f2 (mm) | −9.21 | HFOV (°) | 41.3 |
| f3 (mm) | 31.64 | Fno | 1.82 |
| f4 (mm) | 118.33 | | |
| f5 (mm) | 4.52 | | |
| f6 (mm) | −2.74 | | |

Table 26 below shows the surface type, curvature radius, thickness, refractive index, abbe number, and conic coefficient of each lens in the optical imaging lens assembly of this example, wherein the curvature radius and thickness are expressed in millimeters (mm).

TABLE 26

| | | | | Material | | |
|---|---|---|---|---|---|---|
| Surface No. | Surface Type | Curvature Radius | Thickness | Refractive Index | Abbe Number | Conic Coefficient |
| OBJ | Spherical | Infinite | Infinite | | | |
| STO | Spherical | Infinite | −0.5169 | | | |
| S1 | Aspherical | 1.7433 | 0.7629 | 1.55 | 56.1 | −6.5156 |
| S2 | Aspherical | 7.1799 | 0.0939 | | | 3.3087 |
| S3 | Aspherical | 13.6417 | 0.2332 | 1.67 | 20.4 | 73.6247 |
| S4 | Aspherical | 4.2110 | 0.3292 | | | 2.1715 |
| S5 | Aspherical | 14.9286 | 0.5526 | 1.55 | 56.1 | 96.8775 |
| S6 | Aspherical | 107.9148 | 0.1252 | | | 0.0000 |
| S7 | Aspherical | 15.8549 | 0.2969 | 1.67 | 20.4 | 0.0000 |
| S8 | Aspherical | 19.6824 | 0.3795 | | | −18.0873 |
| S9 | Aspherical | −100.0000 | 0.5674 | 1.55 | 56.1 | 0.0000 |
| S10 | Aspherical | −2.4148 | 0.5536 | | | −1.4911 |
| S11 | Aspherical | −5.6139 | 0.5049 | 1.55 | 56.1 | −0.9324 |
| S12 | Aspherical | 2.1098 | 0.6236 | | | −17.4430 |
| S13 | Spherical | Infinite | 0.1100 | 1.52 | 64.2 | |
| S14 | Spherical | Infinite | 0.2778 | | | |
| S15 | Spherical | Infinite | | | | |

Table 27 below shows the high-order coefficients of each of the aspherical surfaces S1-S12 that can be used for respective aspherical lens in this example. Each aspherical surface type may be defined by formula (1) given in Example 1 above.

TABLE 27

| Surface No. | A4 | A6 | A8 | A10 | A12 |
|---|---|---|---|---|---|
| S1 | 1.4108E−01 | −4.7142E−02 | −2.2007E−02 | 5.0321E−02 | 1.3333E−02 |
| S2 | −4.3902E−02 | −1.3428E−01 | 7.4113E−01 | −1.6519E+00 | 2.0955E+00 |
| S3 | −1.3038E−01 | 2.1092E−01 | −1.5483E−01 | 8.4101E−02 | −1.4328E−01 |
| S4 | −1.0103E−01 | 3.8163E−01 | −1.0658E+00 | 2.6035E+00 | −4.2282E+00 |
| S5 | −1.0252E−01 | 2.2099E−01 | −8.3323E−01 | 1.8681E+00 | −2.5705E+00 |
| S6 | −1.3723E−01 | −5.5431E−02 | 5.7003E−01 | −1.5423E+00 | 2.2909E+00 |
| S7 | −2.1235E−01 | 2.0590E−02 | 2.8940E−01 | −5.7687E−01 | 5.4523E−01 |
| S8 | −1.6898E−01 | 7.3954E−02 | −5.1325E−02 | 1.0306E−01 | −1.6937E−01 |
| S9 | −2.8285E−03 | −1.3987E−01 | 2.3488E−01 | −2.7665E−01 | 2.0977E−01 |
| S10 | 3.4545E−02 | −3.9847E−02 | 2.5818E−02 | −1.8880E−02 | 1.2370E−02 |
| S11 | −1.8914E−01 | 1.3479E−01 | −8.6697E−02 | 4.1360E−02 | −1.2112E−02 |
| S12 | −6.4664E−02 | 2.2048E−02 | −5.2282E−03 | 5.5785E−04 | 4.7415E−05 |

| Surface No. | A14 | A16 | A18 | A20 |
|---|---|---|---|---|
| S1 | −8.4347E−02 | 7.6741E−02 | −3.0122E−02 | 4.4481E−03 |
| S2 | −1.6079E+00 | 7.3726E−01 | −1.8609E−01 | 1.9851E−02 |
| S3 | 2.6223E−01 | −2.3151E−01 | 9.7176E−02 | −1.5880E−02 |
| S4 | 4.2142E+00 | −2.3595E+00 | 6.2005E−01 | −3.8696E−02 |
| S5 | 2.0546E+00 | −8.3519E−01 | 9.3631E−02 | 2.4271E−02 |
| S6 | −2.1310E+00 | 1.2400E+00 | −4.0999E−01 | 5.8123E−02 |
| S7 | −3.1682E−01 | 1.3942E−01 | −4.5529E−02 | 7.1101E−03 |
| S8 | 1.5014E−01 | −7.1562E−02 | 1.7592E−02 | −1.7570E−03 |
| S9 | −1.0034E−01 | 2.9007E−02 | −4.5662E−03 | 2.9802E−04 |
| S10 | −4.6297E−03 | 9.2888E−04 | −9.4585E−05 | 3.8501E−06 |
| S11 | 2.1397E−03 | −2.2429E−04 | 1.2892E−05 | −3.1367E−07 |
| S12 | −2.2541E−05 | 2.8686E−06 | −1.6713E−07 | 3.7843E−09 |

Figure 42:
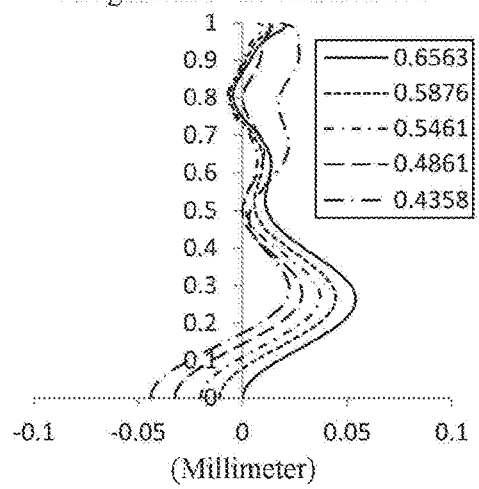
FIGS. 42 to 45 show a longitudinal aberration curve, an astigmatic curve, a distortion curve and a lateral color curve of the optical imaging lens assembly of Example 9, respectively.
Figure 43:
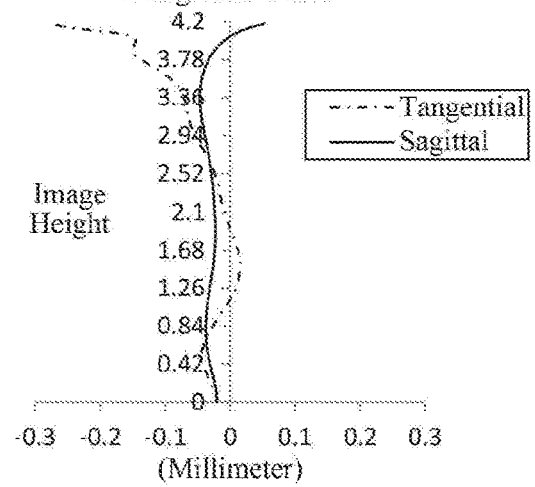
Figure 44:
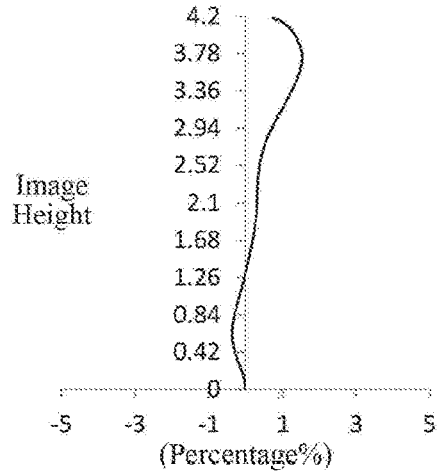
Figure 45:
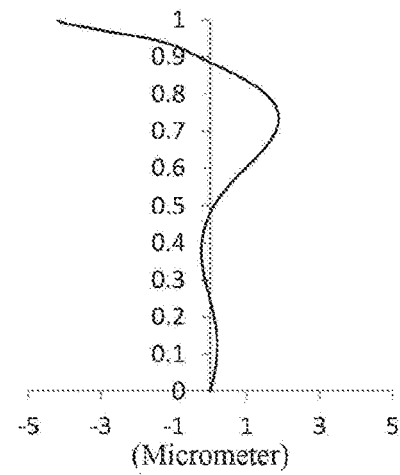

FIG. 42 illustrates a longitudinal aberration curve of the optical imaging system according to Example 9, representing deviations of focal points converged by light of different wavelengths after passing through the optical imaging system. FIG. 43 illustrates an astigmatism curve of the optical imaging system according to Example 9, representing a curvature of a tangential plane and a curvature of a sagittal plane. FIG. 44 illustrates a distortion curve of the optical imaging system according to Example 9, representing amounts of distortion corresponding to different FOVs. FIG. 45 illustrates a lateral color curve of the optical imaging system according to Example 9, representing deviations of different image heights on an image plane after light passes through the optical imaging system. It can be determined from the above description and FIGS. 41 to 45 that the optical imaging lens assembly according to Example 9 is an optical lens assembly having an ultra-large optical imaging surface, which can be used in a 1/2.3-inch chip, and having an ultra-large aperture.

Example 10

An optical imaging lens assembly according to Example 10 of the disclosure is described below with reference to FIGS. 46 to 50.

Figure 46:
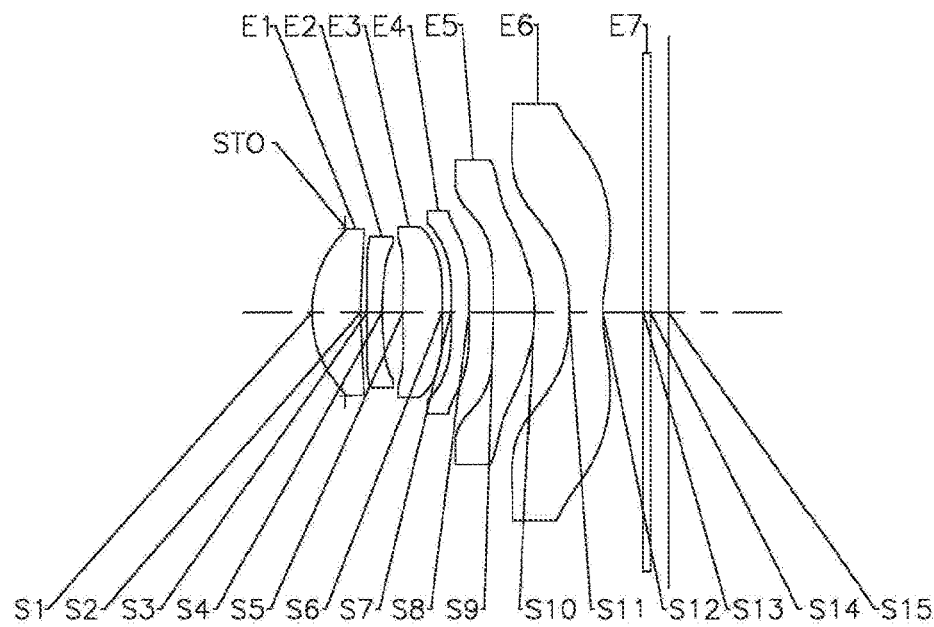
FIG. 46 shows a schematic structural diagram of an optical imaging lens assembly of Example 10.

FIG. 46 is a schematic structural diagram showing the optical imaging lens assembly of Example 10. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be convex. The fourth lens E4 may have a positive refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 28 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 28

| f1 (mm) | 4.05 | f (mm) | 4.64 |
|---|---|---|---|
| f2 (mm) | −9.40 | HFOV (°) | 41.3 |
| f3 (mm) | 26.50 | Fno | 1.82 |
| f4 (mm) | 162.84 | | |
| f5 (mm) | 4.48 | | |
| f6 (mm) | −2.70 | | |

Table 29 below shows the surface type, curvature radius, thickness, refractive index, abbe number, and conic coefficient of each lens in the optical imaging lens assembly of this example, wherein the curvature radius and thickness are expressed in millimeters (mm).

TABLE 29

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5176 | | | |
| S1 | Aspherical | 1.7506 | 0.7481 | 1.55 | 56.1 | −6.5426 |
| S2 | Aspherical | 7.1284 | 0.0948 | | | 3.6771 |
| S3 | Aspherical | 13.5379 | 0.2300 | 1.67 | 20.4 | 75.1249 |
| S4 | Aspherical | 4.2622 | 0.3215 | | | 2.0585 |
| S5 | Aspherical | 14.7423 | 0.5999 | 1.55 | 56.1 | 98.1810 |
| S6 | Aspherical | −800.0000 | 0.1324 | | | 0.0000 |
| S7 | Aspherical | 16.5917 | 0.2747 | 1.67 | 20.4 | 0.0000 |
| S8 | Aspherical | 19.4467 | 0.3734 | | | 38.2781 |
| S9 | Aspherical | −78.6069 | 0.6226 | 1.55 | 56.1 | 0.0000 |
| S10 | Aspherical | −2.3813 | 0.5289 | | | −1.5468 |
| S11 | Aspherical | −5.5230 | 0.5142 | 1.55 | 56.1 | −0.9025 |
| S12 | Aspherical | 2.0826 | 0.6190 | | | −15.4867 |
| S13 | Spherical | Infinite | 0.1100 | 1.52 | 64.2 | |
| S14 | Spherical | Infinite | 0.2733 | | | |
| S15 | Spherical | Infinite | | | | |

Table 30 below shows the high-order coefficients of each of the aspherical surfaces S1-S12 that can be used for respective aspherical lens in this example. Each aspherical surface type may be defined by formula (1) given in Example 1 above.

TABLE 30

| Surface No. | A4 | A6 | A8 | A10 | A12 |
|---|---|---|---|---|---|
| S1 | 1.4433E−01 | −6.0432E−02 | −7.7970E−03 | 6.0485E−02 | −2.5029E−02 |
| S2 | −7.4567E−02 | 1.0592E−01 | −2.2616E−01 | 5.5570E−01 | −9.2211E−01 |
| S3 | −1.3482E−01 | 2.5822E−01 | −4.4907E−01 | 9.9702E−01 | −1.7143E+00 |
| S4 | −7.6265E−02 | 1.3491E−01 | 2.0205E−01 | −1.3522E+00 | 3.4963E+00 |
| S5 | −9.2630E−02 | 2.2316E−01 | −1.1547E+00 | 3.4716E+00 | −6.4494E+00 |
| S6 | −1.4574E−01 | 3.2370E−02 | 2.7916E−01 | −1.0887E+00 | 1.9316E+00 |
| S7 | −2.2358E−01 | 9.1186E−02 | 1.3439E−01 | −5.1628E−01 | 8.1612E−01 |
| S8 | −1.6488E−01 | 5.8948E−02 | 3.1311E−03 | −2.7318E−02 | 1.8226E−02 |
| S9 | −2.2049E−01 | −5.4481E−02 | 6.3832E−02 | −8.2162E−02 | 7.7370E−02 |
| S10 | 2.8315E−02 | −2.4422E−02 | 9.3352E−03 | −7.8624E−03 | 7.2900E−03 |
| S11 | −1.9544E−01 | 1.4002E−01 | −8.7634E−02 | 4.0521E−02 | −1.1584E−02 |
| S12 | −7.3426E−02 | 3.0994E−02 | −1.0016E−02 | 2.0899E−03 | −2.5688E−04 |

| Surface No. | A14 | A16 | A18 | A20 |
|---|---|---|---|---|
| S1 | −4.5968E−02 | 5.7711E−02 | −2.5194E−02 | 3.8855E−03 |
| S2 | 9.1527E−01 | −5.2529E−01 | 1.6046E−01 | −2.0206E−02 |
| S3 | 1.8543E+00 | −1.1774E+00 | 4.0160E−01 | −5.6810E−02 |
| S4 | −5.2162E+00 | 4.6042E+00 | −2.2168E+00 | 4.4962E−01 |
| S5 | 7.3705E+00 | −5.0234E+00 | 1.8601E+00 | −2.8453E−01 |
| S6 | −2.0071E+00 | 1.2455E+00 | −4.2490E−01 | 6.0871E−02 |
| S7 | −7.9324E−01 | 4.8198E−01 | −1.6352E−01 | 2.3117E−02 |
| S8 | −8.4527E−03 | 5.3168E−03 | −2.1490E−03 | 3.2275E−04 |
| S9 | −4.6569E−02 | 1.6395E−02 | −3.0044E−03 | 2.1976E−04 |
| S10 | −3.0905E−03 | 6.4658E−04 | −6.6592E−05 | 2.7056E−06 |
| S11 | 2.0074E−03 | −2.0703E−04 | 1.1733E−05 | −2.8194E−07 |
| S12 | 1.4465E−05 | 2.1863E−07 | −6.5195E−08 | 2.1679E−09 |

Figure 47:
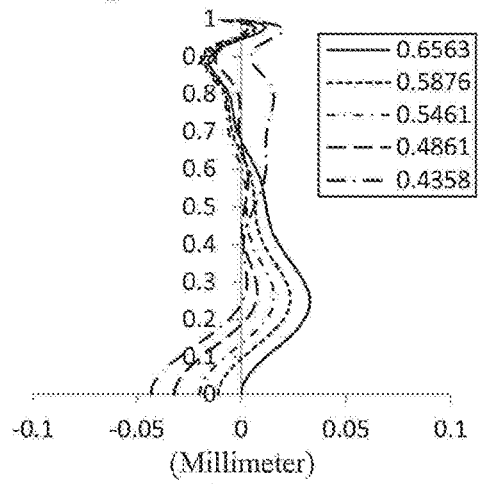
FIGS. 47 to 50 show a longitudinal aberration curve, an astigmatic curve, a distortion curve and a lateral color curve of the optical imaging lens assembly of Example 10, respectively.
Figure 48:
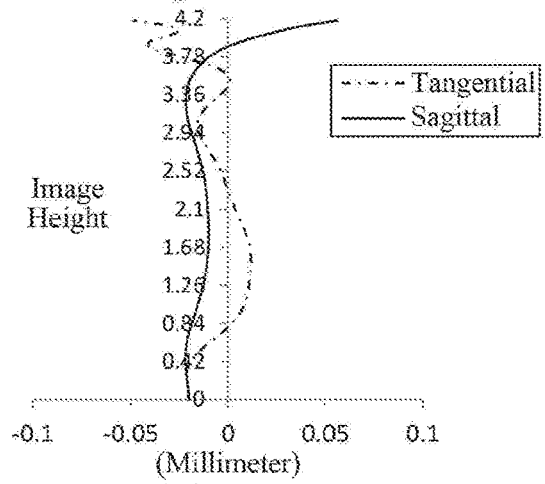
Figure 49:
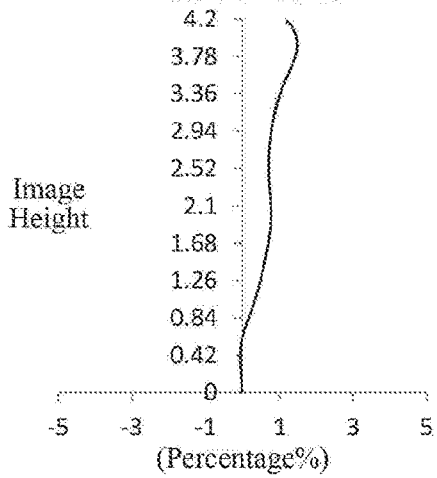
Figure 50:
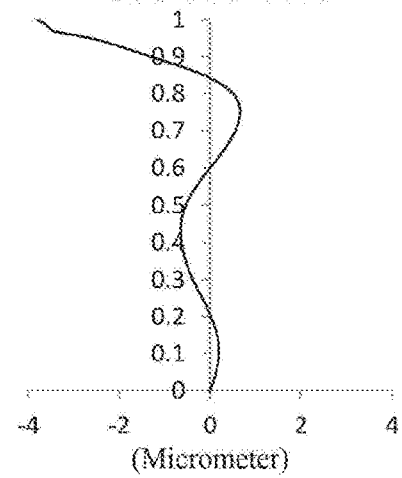

FIG. 47 illustrates a longitudinal aberration curve of the optical imaging system according to Example 10, representing deviations of focal points converged by light of different wavelengths after passing through the optical imaging system. FIG. 48 illustrates an astigmatism curve of the optical imaging system according to Example 10, representing a curvature of a tangential plane and a curvature of a sagittal plane. FIG. 49 illustrates a distortion curve of the optical imaging system according to Example 10, representing amounts of distortion corresponding to different FOVs. FIG. 50 illustrates a lateral color curve of the optical imaging system according to Example 10, representing deviations of different image heights on an image plane after light passes through the optical imaging system. It can be determined from the above description and FIGS. 46 to 50 that the optical imaging lens assembly according to Example 10 is an optical lens assembly having an ultra-large optical imaging surface, which can be used in a 1/2.3-inch chip, and having an ultra-large aperture.

Example 11

An optical imaging lens assembly according to Example 11 of the disclosure is described below with reference to FIGS. 51 to 55.

Figure 51:
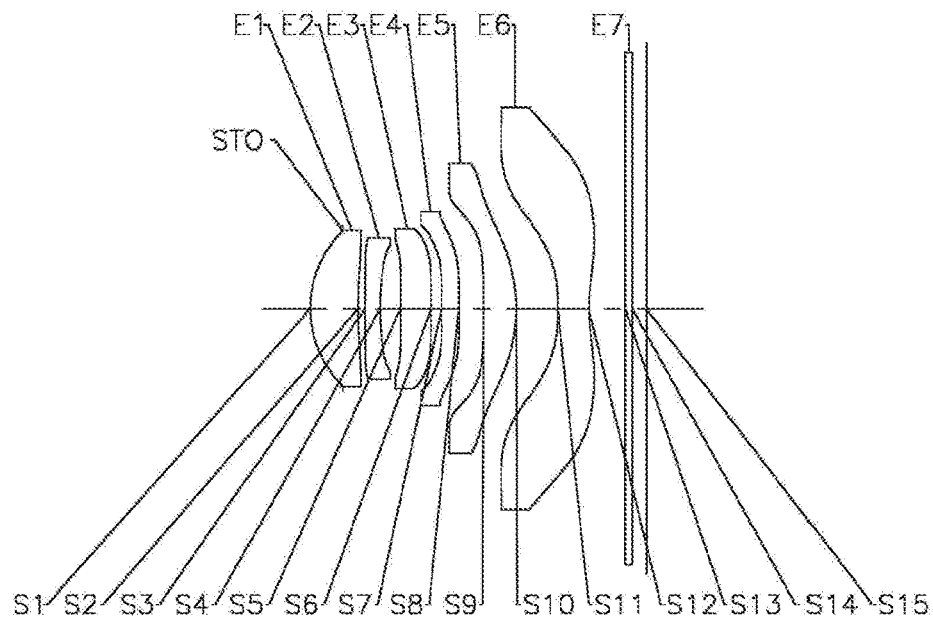
FIG. 51 shows a schematic structural diagram of an optical imaging lens assembly of Example 11.

FIG. 51 is a schematic structural diagram showing the optical imaging lens assembly of Example 11. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave. The second lens E2 may have a negative refractive power. An object side surface S3 of the second lens E2 may be convex and an image side surface S4 of the second lens E2 may be concave. The third lens E3 may have a positive refractive power. An object side surface S5 of the third lens E3 may be convex, and an image side surface S6 of the third lens E3 may be concave. The fourth lens E4 may have a positive refractive power. An object side surface S7 of the fourth lens E4 may be convex, and an image side surface S8 of the fourth lens E4 may be concave. The fifth lens E5 may have a positive refractive power. An object side surface S9 of the fifth lens E5 may be concave, and an image side surface S10 of the fifth lens E5 may be convex. The sixth lens E6 may have a negative refractive power. An object side surface S11 of the sixth lens E6 may be concave, and an image side surface S12 of the sixth lens E6 may be concave.

Table 31 below shows effective focal lengths f1 to f6 of the first lens E1 to the sixth lens E6, a total effective focal length f of the optical imaging lens assembly, F-number Fno of the optical imaging lens assembly, and half of a maximum field of view HFOV (°) of the imaging lens assembly.

TABLE 31

| f1 (mm) | 3.79 | f (mm) | 4.57 |
|---|---|---|---|
| f2 (mm) | −8.89 | HFOV (°) | 41.3 |
| f3 (mm) | 68.42 | Fno | 1.93 |
| f4 (mm) | 294.20 | | |
| f5 (mm) | 4.45 | | |
| f6 (mm) | −2.69 | | |

Table 32 below shows the surface type, curvature radius, thickness, refractive index, abbe number, and conic coefficient of each lens in the optical imaging lens assembly of this example, wherein the curvature radius and thickness are expressed in millimeters (mm).

TABLE 32

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.4970 | | | |
| S1 | Aspherical | 1.6520 | 0.7341 | 1.55 | 56.1 | −6.1843 |
| S2 | Aspherical | 6.9041 | 0.1050 | | | 0.5982 |
| S3 | Aspherical | 12.6968 | 0.2300 | 1.67 | 20.4 | 77.1962 |
| S4 | Aspherical | 4.0182 | 0.3117 | | | 3.3642 |
| S5 | Aspherical | 16.0189 | 0.4717 | 1.55 | 56.1 | 88.0473 |
| S6 | Aspherical | 27.7368 | 0.1606 | | | 0.0000 |
| S7 | Aspherical | 13.4664 | 0.2622 | 1.67 | 20.4 | 0.0000 |
| S8 | Aspherical | 14.3430 | 0.3831 | | | −22.3137 |
| S9 | Aspherical | −67.9087 | 0.4995 | 1.55 | 56.1 | 0.0000 |
| S10 | Aspherical | −2.3520 | 0.6287 | | | −1.3291 |
| S11 | Aspherical | −5.5944 | 0.4699 | 1.54 | 55.9 | −0.5406 |
| S12 | Aspherical | 2.0028 | 0.5617 | | | −18.4233 |
| S13 | Spherical | Infinite | 0.1100 | 1.52 | 64.2 | |
| S14 | Spherical | Infinite | 0.2157 | | | |
| S15 | Spherical | Infinite | | | | |

Table 33 below shows the high-order coefficients of each of the aspherical surfaces S1-S12 that can be used for respective aspherical lens in this example. Each aspherical surface type may be defined by formula (1) given in Example 1 above.

TABLE 33

| Surface No. | A4 | A6 | A8 | A10 | A12 |
|---|---|---|---|---|---|
| S1 | 1.7295E−01 | −1.2869E−01 | 1.3683E−01 | −8.1078E−02 | −4.7603E−02 |
| S2 | −9.0400E−02 | 1.5501E−01 | −3.3481E−01 | 7.3866E−01 | −1.1522E+00 |
| S3 | −1.5526E−01 | 3.0000E−01 | −4.4488E−01 | 9.3793E−01 | −1.7799E+00 |
| S4 | −1.1177E−01 | 4.3311E−01 | −1.5163E+00 | 5.2117E+00 | −1.2041E+01 |
| S5 | −1.0140E−01 | 8.9959E−02 | −3.5478E−01 | 9.6267E−01 | −1.7493E+00 |
| S6 | −1.5331E−01 | 1.2366E−01 | −1.3710E−01 | −1.2921E−01 | 6.7553E−01 |
| S7 | −2.4127E−01 | 1.4287E−01 | −1.0349E−01 | 2.9564E−02 | 8.6735E−02 |
| S8 | −1.9287E−01 | 8.8377E−02 | −5.2723E−02 | 4.0539E−02 | −3.1218E−02 |
| S9 | −3.2177E−02 | −8.7345E−02 | 1.9279E−01 | −2.7875E−01 | 2.4282E−01 |
| S10 | 8.2943E−03 | −3.2695E−02 | 7.6535E−02 | −8.5966E−02 | 5.2259E−02 |
| S11 | −2.8881E−01 | 2.6478E−01 | −1.5744E−01 | 6.2399E−02 | −1.5820E−02 |
| S12 | −1.0647E−01 | 6.0785E−02 | −2.2415E−02 | 4.8125E−03 | −5.2534E−04 |

TABLE 33-continued

| Surface No. | A14 | A16 | A18 | A20 |
|---|---|---|---|---|
| S1 | 1.5443E−01 | −1.4420E−01 | 6.3798E−02 | −1.1406E−02 |
| S2 | 1.1135E+00 | −6.3018E−01 | 1.8950E−01 | −2.3292E−02 |
| S3 | 2.1899E+00 | −1.5811E+00 | 6.1323E−01 | −9.9039E−02 |
| S4 | 1.7543E+01 | −1.5461E+01 | 7.5420E+00 | −1.5584E+00 |
| S5 | 1.8566E+00 | −1.0014E+00 | 1.6098E−01 | 4.0108E−02 |
| S6 | −1.0912E+00 | 9.2312E−01 | −4.0258E−01 | 7.0747E−02 |
| S7 | −2.0756E−01 | 2.1628E−01 | −1.0434E−01 | 1.8499E−02 |
| S8 | 1.3091E−02 | 3.0186E−03 | −3.9051E−03 | 7.9143E−04 |
| S9 | −1.3090E−01 | 4.2344E−02 | −7.4070E−03 | 5.3351E−04 |
| S10 | −1.7855E−02 | 3.4386E−03 | −3.4894E−04 | 1.4506E−05 |
| S11 | 2.5284E−03 | −2.4691E−04 | 1.3476E−05 | −3.1537E−07 |
| S12 | 4.9031E−06 | 5.3399E−06 | −5.3148E−07 | 1.6498E−08 |

Figure 52:
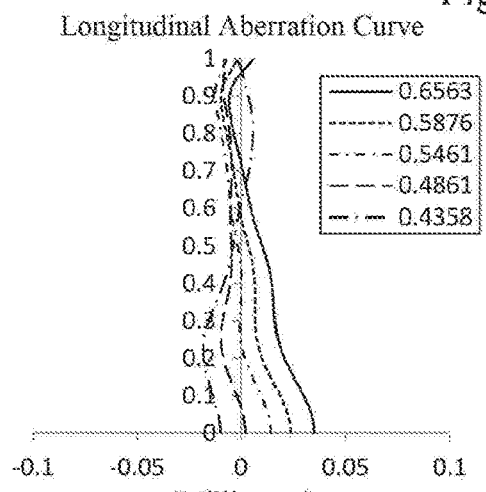
FIGS. 52 to 55 show a longitudinal aberration curve, an astigmatic curve, a distortion curve and a lateral color curve of the optical imaging lens assembly of Example 11, respectively.
Figure 53:
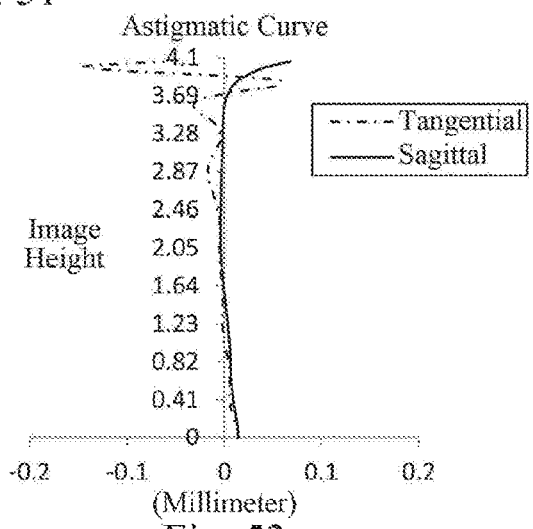
Figure 54:
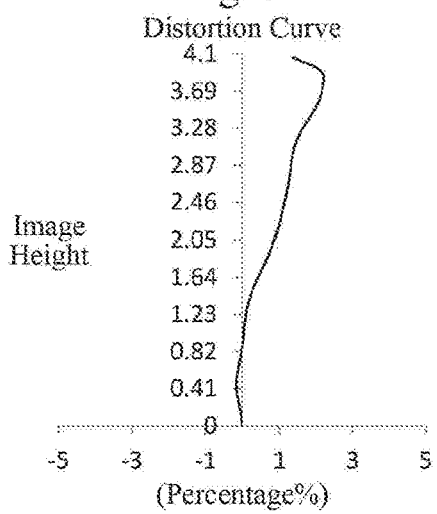
Figure 55:
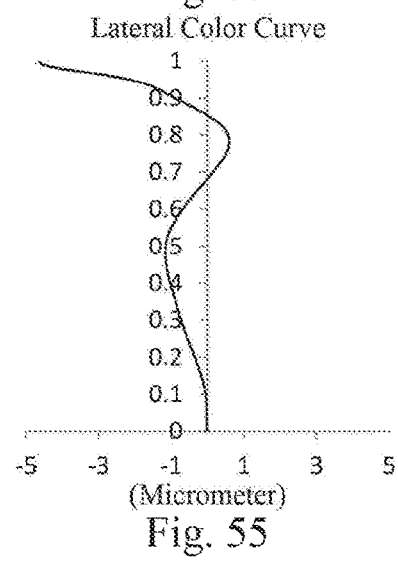

FIG. 52 illustrates a longitudinal aberration curve of the optical imaging system according to Example 11, representing deviations of focal points converged by light of different wavelengths after passing through the optical imaging system. FIG. 53 illustrates an astigmatism curve of the optical imaging system according to Example 11, representing a curvature of a tangential plane and a curvature of a sagittal plane. FIG. 54 illustrates a distortion curve of the optical imaging system according to Example 11, representing amounts of distortion corresponding to different FOVs. FIG. 55 illustrates a lateral color curve of the optical imaging system according to Example 11, representing deviations of different image heights on an image plane after light passes through the optical imaging system. It can be determined from the above description and FIGS. 51 to 55 that the optical imaging lens assembly according to Example 11 is an optical lens assembly having an ultra-large optical imaging surface, which can be used in a 1/2.3-inch chip, and having an ultra-large aperture.

In summary, various conditional expressions in Examples 1 to 11 above have values listed in Table 34 below.

TABLE 34

| Conditional | Example | | | | | | | | | | |
|---|---|---|---|---|---|---|---|---|---|---|---|
| | 1 | 2 | 3 | 4 | 5 | 6 | 7 | 8 | 9 | 10 | 11 |
| f5*tan (HFOV)/CT5 | 7.08 | 7.13 | 6.40 | 6.76 | 6.83 | 6.95 | 7.68 | 4.63 | 7.00 | 6.31 | 7.81 |
| ImgH/TTL | 0.77 | 0.77 | 0.77 | 0.76 | 0.77 | 0.76 | 0.82 | 0.75 | 0.77 | 0.77 | 0.79 |
| \|f/f3\| + \|f/f4\| | 0.10 | 0.07 | 0.22 | 0.03 | 0.10 | 0.06 | 0.08 | 0.27 | 0.19 | 0.20 | 0.08 |
| \|f/f2\| + \|f/f6\| | 2.06 | 2.13 | 2.19 | 2.08 | 2.11 | 2.07 | 2.23 | 2.35 | 2.20 | 2.21 | 2.22 |
| f1/f | 0.94 | 0.91 | 0.89 | 0.93 | 0.96 | 0.90 | 0.88 | 1.14 | 0.89 | 0.90 | 0.85 |
| f/R5 | 0.19 | 0.26 | 0.32 | 0.24 | 0.20 | 0.26 | 0.25 | 0.41 | 0.31 | 0.31 | 0.29 |
| f/R10 | −1.82 | −1.92 | −1.89 | −1.97 | −1.82 | −2.01 | −1.97 | −2.26 | −1.92 | −1.95 | −1.94 |
| R7/R8 | 1.14 | 0.72 | 0.80 | 0.91 | 1.09 | 0.75 | 0.92 | 1.69 | 0.81 | 0.85 | 0.94 |
| T34/(CT3 + CT4) | 0.18 | 0.18 | 0.14 | 0.18 | 0.20 | 0.17 | 0.21 | 0.30 | 0.15 | 0.15 | 0.22 |
| (T45 + T56)/CT5 | 2.00 | 1.95 | 1.47 | 1.75 | 2.07 | 1.76 | 2.01 | 1.61 | 1.64 | 1.45 | 2.03 |
| f/EPD | 1.84 | 1.84 | 1.79 | 1.86 | 1.84 | 1.87 | 1.92 | 1.80 | 1.82 | 1.82 | 1.93 |

The foregoing is only a description of the preferred examples of the disclosure and the applied technical principles. It should be appreciated by those skilled in the art that the scope of the invention involved in the disclosure is not limited to the technical solutions formed by the particular combinations of the above technical features. The scope of the invention should also cover other technical solutions obtained by any combinations of the above technical features or equivalent features thereof without departing from the concept of the invention, such as, technical solutions formed by replacing the features as disclosed in the disclosure with (but not limited to), technical features with similar functions.

What is claimed is:

1. An optical imaging lens assembly comprising, sequentially from an object side to an image side of the optical imaging lens assembly, a first lens, a second lens, a third lens, a fourth lens, a fifth lens, and a sixth lens, wherein:
   the first lens has a positive refractive power;
   the second lens has a negative refractive power with a convex object side surface and a concave image side surface;
   the third lens has a refractive power;
   the fourth lens has a positive, refractive power;
   the fifth lens has a positive refractive power with a convex image side surface;
   the sixth lens has a negative refractive power with a concave object side surface and a concave image side surface;
   an effective focal length f of the optical imaging lens assembly, an effective focal length f3 of the third lens and an effective focal length f4 of the fourth lens satisfy |f/f3|+|f/f4|≤0.3; and
   wherein the effective focal length f of the optical imaging lens assembly and a curvature radius R5 of an object side surface of the third lense satisfy 0<f/R5<0.5.

2. The optical imaging lens assembly according to claim 1, wherein half of a diagonal length ImgH of an effective pixel region on an imaging surface and a distance TTL along an optical axis from an object side surface of the first lens to the imaging surface satisfy 0.75≤ImgH/TTL≤0.9.

3. The optical imaging lens assembly according to claim 1, wherein the effective focal length f of the optical imaging lens assembly, an effective focal length f2 of the second lens, and an effective focal length f6 of the sixth lens satisfy 2.0≤|f/f2|+|f/f6|<3.0.

4. The optical imaging lens assembly according to claim 1, wherein an effective focal length f1 of the first lens and an effective focal length f5 of the fifth lens satisfy 0.5<f1/f5<1.2.

5. The optical imaging lens assembly according to claim 1, wherein the effective focal length f of the optical imaging lens assembly and a curvature radius R5 of an object side surface of the third lens satisfy 0.19≤f/R5≤0.41.

6. The optical imaging lens assembly according to claim 1, wherein the effective focal length f of the optical imaging lens assembly and a curvature radius R10 of the image side surface of the fifth lens satisfy −2.5<f/R10<−1.5.

7. The optical imaging lens assembly according to claim 1, wherein a curvature radius R7 of an object side surface of the fourth lens and a curvature radius R8 of an image side surface of the fourth lens satisfy 0.5<R7/R8<2.0.

8. The optical imaging lens assembly according to claim 1, wherein a space interval T34 between the third lens and the fourth lens along an optical axis, a central thickness CT3 of the third lens, and a central thickness CT4 of the fourth lens satisfy T34/(CT3+CT4)≤0.3.

9. The optical imaging lens assembly according to claim 1, wherein the effective focal length f of the optical imaging lens assembly and an entrance pupil diameter EPD of the optical imaging lens assembly satisfy f/EPD≤2.0.

10. The optical imaging lens assembly according to claim 1, wherein the first lens has a convex object side surface and a concave image side surface, and the fourth lens has a convex object side surface and a concave image side surface.

11. An optical imaging lens assembly comprising, sequentially from an object side to an image side of the optical imaging lens assembly, a first lens, a second lens, a third lens, a fourth lens, a fifth lens, and a sixth lens, wherein:
the first lens has a positive refractive power with a convex object side surface and a concave image side surface;
the second lens has a negative refractive power with a convex object side surface and a concave image side surface;
the third lens has a refractive power;
the fourth lens has a refractive power with a convex object side surface and a concave image side surface;
the fifth lens has a positive refractive power with a convex image side surface;
the sixth lens has a negative refractive power with a concave object side surface and a concave image side surface; and
half of a maximum field of view HFOV of the optical imaging lens assembly, an effective focal length f5 of the fifth lens, and a central thickness CT5 of the fifth lens satisfy 6.31≤f5* tan (HFOV)/CT5≤8.0.

12. The optical imaging lens assembly according to claim 11, wherein half of a diagonal length ImgH of an effective pixel region on an imaging surface and a distance TTL along an optical axis from the object side surface of the first lens to the imaging surface satisfy 0.75≤ImgH/TTL≤0.9.

13. The optical imaging lens assembly according to claim 11, wherein an effective focal length f of the optical imaging lens assembly, an effective focal length f2 of the second lens, and an effective focal length f6 of the sixth lens satisfy 2.0|f/f2|+|f/f6|<3.0.

14. The optical imaging lens assembly according to claim 11, wherein an effective focal length f1 of the first lens and the effective focal length f5 of the fifth lens satisfy 0.5<f1/f5<1.2.

15. The optical imaging lens assembly according to claim 11, wherein an effective focal length f of the optical imaging lens assembly and a curvature radius R5 of an object side surface of the third lens satisfy 0<f/R5<0.5.

16. The optical imaging lens assembly according to claim 11, wherein an effective focal length f of the optical imaging lens assembly and a curvature radius R10 of the image side surface of the fifth lens satisfy −2.5<f/R10<−1.5.

17. The optical imaging lens assembly according to claim 11, wherein a curvature radius R7 of the object side surface of the fourth lens and a curvature radius R8 of the image side surface of the fourth lens satisfy 0.5<R7/R8<2.0.

18. The optical imaging lens assembly according to claim 11, wherein a space interval T34 between the third lens and the fourth lens along an optical axis, a central thickness CT3 of the third lens, and a central thickness CT4 of the fourth lens satisfy T34/(CT3+CT4)≤0.3.

19. The optical imaging lens assembly according to claim 11, wherein an effective focal length f of the optical imaging lens assembly and an entrance pupil diameter EPD of the optical imaging lens assembly satisfy f/EPD≤2.0.

20. The optical imaging lens assembly according to claim 11, wherein a space interval T45 between the fourth lens and the fifth lens along an optical axis, a space interval T56 between the fifth lens and the sixth lens along the optical axis, and the central thickness CT5 of the fifth lens satisfy 1.3<(T45+T56)/CT5<2.5.

* * * * *